(12) United States Patent
Guo et al.

(10) Patent No.: US 11,716,666 B2
(45) Date of Patent: Aug. 1, 2023

(54) CELL HANDOVER METHOD AND APPARATUS IN HIGH-SPEED MOVEMENT SCENARIO

(71) Applicant: Huawei Technologies Co., Ltd., Shenzhen (CN)

(72) Inventors: Tao Guo, Xi'an (CN); Shujun Dang, Shenzhen (CN); Zhongjin Li, Shenzhen (CN); Chuan Li, Shanghai (CN); Zhiyuan Hou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 32 days.

(21) Appl. No.: 17/285,729

(22) PCT Filed: Oct. 16, 2018

(86) PCT No.: PCT/CN2018/110351
§ 371 (c)(1),
(2) Date: Apr. 15, 2021

(87) PCT Pub. No.: WO2020/077517
PCT Pub. Date: Apr. 23, 2020

(65) Prior Publication Data
US 2022/0007260 A1     Jan. 6, 2022

(51) Int. Cl.
*H04W 36/32*         (2009.01)
*H04W 36/00*         (2009.01)

(52) U.S. Cl.
CPC ....... *H04W 36/32* (2013.01); *H04W 36/0058* (2018.08); *H04W 36/00835* (2018.08)

(58) Field of Classification Search
CPC ....... H04W 36/0058; H04W 36/00835; H04W 36/00837; H04W 36/32
See application file for complete search history.

(56) References Cited

U.S. PATENT DOCUMENTS

| 2011/0212737 A1* | 9/2011 | Isidore | H04W 4/16 |
| | | | 455/466 |
| 2012/0300827 A1 | 11/2012 | Chung | |

(Continued)

FOREIGN PATENT DOCUMENTS

| CN | 101184331 A | 5/2008 |
| CN | 101400088 A | 4/2009 |

(Continued)

OTHER PUBLICATIONS

Jiangang, Q., et al, "A New Method to Distinguish Interior/Exterior Users in LTE," Telecommunications Science, Jan. 2009, with an English Abstract, 4 pages.

(Continued)

*Primary Examiner* — Lester G Kincaid
*Assistant Examiner* — Dung L Lam
(74) *Attorney, Agent, or Firm* — Conley Rose, P.C.

(57) ABSTRACT

This application relates to the field of communications technologies, and provides a cell handover method and an apparatus in a high-speed movement scenario, to resolve problems of a relatively high service drop rate and a relatively high re-establishment rate of a terminal device in the high-speed movement scenario. The method includes: enabling a high-speed railway function of a terminal device; obtaining path information; determining a first target cell based on the path information; and reporting a first measurement report when a measurement value of a source cell meets a second threshold, where the first measurement report is used to trigger a network side device to control the terminal device to hand over from the source cell to the first target cell, and the source cell is a cell on which the terminal device camps, the second threshold is greater than a first threshold, and the first threshold is a threshold that is (Continued)

indicated by the network side device and that is used to trigger the terminal device to report a measurement report.

20 Claims, 11 Drawing Sheets

(56) References Cited

U.S. PATENT DOCUMENTS

| | | | |
|---|---|---|---|
| 2013/0053025 A1 | 2/2013 | Lindoff et al. | |
| 2013/0244664 A1 | 9/2013 | Song et al. | |
| 2014/0213259 A1 | 7/2014 | Teyeb et al. | |
| 2016/0345222 A1* | 11/2016 | Axmon | H04W 36/04 |
| 2016/0381610 A1 | 12/2016 | Pu et al. | |
| 2017/0181048 A1 | 6/2017 | Shah et al. | |
| 2019/0297551 A1 | 9/2019 | Wang et al. | |
| 2019/0297666 A1* | 9/2019 | McKibben | H04W 76/50 |
| 2022/0007260 A1* | 1/2022 | Guo | H04W 36/00837 |

FOREIGN PATENT DOCUMENTS

| | | | | |
|---|---|---|---|---|
| CN | 101453770 A | | 6/2009 | |
| CN | 101663905 A | | 3/2010 | |
| CN | 101772120 A | | 7/2010 | |
| CN | 102271374 A | | 12/2011 | |
| CN | 102300279 A | | 12/2011 | |
| CN | 102404784 A | | 4/2012 | |
| CN | 102802191 A | | 11/2012 | |
| CN | 103167570 A | | 6/2013 | |
| CN | 103379572 A | | 10/2013 | |
| CN | 101953222 B | | 5/2014 | |
| CN | 103888978 A | | 6/2014 | |
| CN | 103891356 A | | 6/2014 | |
| CN | 104170470 A | | 11/2014 | |
| CN | 106102108 A | | 11/2016 | |
| CN | 106304125 A | | 1/2017 | |
| CN | 106304177 A | | 1/2017 | |
| CN | 106507410 A | | 3/2017 | |
| CN | 106792556 A | | 5/2017 | |
| CN | 107889151 A | | 4/2018 | |
| CN | 108616804 A | | 10/2018 | |
| CN | 113133076 A | * | 7/2021 | H04W 36/08 |
| WO | 2011141230 A1 | | 11/2011 | |
| WO | 2017053292 A1 | | 3/2017 | |
| WO | 2018034739 A1 | | 2/2018 | |
| WO | 2018107403 A1 | | 6/2018 | |

OTHER PUBLICATIONS

NTT Docomo, "Discussion on Enhancements to Measurement Report Mechanism for UAV," 3GPP TSG RAN WG2 Meeting #101, Athens, Greece, R2-1803713, Feb. 26-Mar. 2, 2018, 9 pages.

Ericsson, et al, "Prohibit timer for measurement reporting," 3GPP TSG-WG2 Meeting #103bis, Chengdu, China, Oct. 8-12, 2018, R2-1814760, 74 pages.

Ying, M., "Research on Handover Optimization Method of TD-LTE System," Information and Communications, 2017, 3 pages.

Hao, W., et al, "Research on the Fast Algorithm for GSM-Rswitching for High-speed Railway," Journal of Railway Engineering Society, Jan. 2009, with an English Abstract, 5 pages.

* cited by examiner

CELL HANDOVER METHOD AND APPARATUS IN HIGH-SPEED MOVEMENT SCENARIO

CROSS-REFERENCE TO RELATED APPLICATIONS

This application is a U.S. National Stage of International Patent Application No. PCT/CN2018/110351 filed on Oct. 16, 2018, which is hereby incorporated by reference in its entirety.

TECHNICAL FIELD

This application relates to the field of communications technologies, and in particular, to a cell handover method and an apparatus in a high-speed movement scenario.

BACKGROUND

In a high-speed railway mobile communications system, a terminal device (terminal equipment) moves at a high speed along with a high-speed train. Therefore, the terminal device needs to perform cell handover at a high frequency. Consequently, problems of a ping-pong handover, a relatively high re-establishment rate, a relatively high service drop rate, and the like occur.

SUMMARY

This application provides a cell handover method and an apparatus in a high-speed movement scenario, to resolve problems of a relatively high service drop rate and a relatively high re-establishment rate of a terminal device in the high-speed movement scenario.

According to a first aspect, this application provides a cell handover method in a high-speed movement scenario, applied to a terminal device. The method includes: enabling a high-speed railway function of the terminal device; obtaining path information; determining a first target cell based on the path information; and reporting a first measurement report when a measurement value of a source cell meets a second threshold, where the first measurement report is used to trigger a network side device to control the terminal device to hand over from the source cell to the first target cell; and the source cell is a cell on which the terminal device camps, the second threshold is greater than a first threshold, and the first threshold is a threshold that is indicated by the network side device and that is used to trigger the terminal device to report a measurement report.

According to the method provided in this application, after enabling the high-speed railway function, the terminal device can measure signals in the source cell and the first target cell based on the second threshold greater than the first threshold after detecting the first target cell, and reports the first measurement report in advance when the measurement value of the source cell meets the second threshold, to trigger the network side device in advance to control the terminal device to hand over from the source cell to the first target cell, instead of reporting the first measurement report only when the measurement value of the source cell meets the first threshold. In this way, it is ensured that the terminal device is handed over to the target cell before the signal in the source cell is attenuated to a degree that a service cannot be provided, thereby avoiding problems of a service drop and re-establishment caused by a handover timeout, and reducing a service drop rate and a re-establishment rate.

Optionally, after the reporting a first measurement report, the method further includes: receiving a handover command sent by the network side device, where the handover command is used to instruct the terminal device to hand over from the source cell to the first target cell; and handing over from the source cell to the first target cell in response to the handover command, where the terminal device camps on the first target cell after the handover.

Optionally, the measurement value is a reference signal received power RSRP, a received signal strength indicator RSSI, or reference signal received quality RSRQ.

Optionally, the path information includes a handover sequence of a plurality of nodes on a movement path of the terminal device and information about each of the plurality of nodes; and the information about each node includes an identifier of the node and identifiers of a plurality of cells in the node.

In this optional manner, the terminal device can determine, based on the path information, a node in which a cell on which the terminal device currently camps is located, a cell in the current node, a next node that is to be entered, a cell in the next node, a previous node of the current node, and a cell in the previous node, so that when being handed over between adjacent nodes, the terminal device determines the node in which the detected cell is located, to determine a used handover policy.

Optionally, the first target cell is a cell in a next node of a node in which the source cell is located.

Optionally, the information about each node includes handover priorities of the plurality of cells in the node, and the first target cell is a cell that has a highest priority and that is detected by the terminal device in the next node.

In this optional manner, the information about the node includes the handover priorities, so that when detecting a plurality of cells that belong to the next node, the terminal device can select, based on priority information, the cell with the highest priority for a handover.

Optionally, the method further includes: determining a second target cell based on the path information, where the second target cell is a cell in a previous node of the node in which the source cell is located; and reporting a second measurement report when the measurement value of the source cell meets a third threshold, where the second measurement report is used to trigger the network side device to control the terminal device to hand over from the source cell to the second target cell, and the third threshold is less than the first threshold.

In this optional manner, when detecting the cell in the previous node, the terminal device may delay reporting the measurement report to delay triggering the network side device to control the terminal device to hand over from the source cell to the second target cell, thereby avoiding a ping-pong handover.

Optionally, the obtaining path information includes: locally obtaining the pre-stored path information; or receiving the path information sent by the network side device.

Optionally, the obtaining path information includes: obtaining a path information set, where the path information set includes path information of a plurality of paths, and the plurality of paths include the movement path of the terminal device. The method further includes: determining, based on the path information of the plurality of paths, a plurality of target nodes of the node in which the source cell is located; and when determining that a detected cell includes a cell belonging to one of the plurality of target nodes but does not include a cell belonging to a node other than the one of the plurality of target nodes, determining, by the terminal device, that the one target node is the next node.

Optionally, the information about each node further includes a frequency coverage area and a transmission mode of each of the plurality of cells in the node. The method further includes: determining a cell that meets a camping condition in a plurality of cells in the node in which the source cell is located, where the camping condition is that a frequency division duplex mode is used and a frequency coverage area has a highest priority; and reporting a third measurement report when the cell that meets the camping condition is not the source cell, where the third measurement report is used to trigger the network side device to control the terminal device to hand over from the source cell to the cell that meets the camping condition.

In this optional manner, the terminal device may autonomously choose to camp on a cell that is in the node and that uses a frequency division duplex mode, has a largest frequency coverage area, and has best signal quality, thereby improving user experience.

Optionally, all cells recorded in the path information are cells on a high-speed railway dedicated network; and when the terminal device is in an idle mode in a high-speed movement process, the method further includes: When performing cell reselection, the terminal device determines, based on the path information, that a detected neighboring cell of the source cell is a cell on the high-speed railway dedicated network, and the terminal device camps on the neighboring cell.

Optionally, if the terminal device detects a 2G/3G signal, and signal quality of the source cell meets a condition for providing a service for the terminal device, the terminal device delays requesting the network side device to hand over the terminal device to a 2G/3G network.

In this optional manner, the terminal device may delay handing over to the 2G/3G network, thereby improving user experience.

Optionally, the method further includes: reporting handover information after the terminal device reaches an end point of the movement path, where the handover information includes an identifier of a source cell and an identifier of a target cell in each handover performed by the terminal device in a process in which the terminal device moves along the movement path, and the handover information is to be used by the network side device to optimize the path information.

Optionally, the first threshold is a threshold in an A3 event, a threshold in an A5 event, a threshold in a B1 event, or a threshold in a B2 event.

According to a second aspect, an embodiment of this application provides an apparatus. The apparatus may be a terminal device or a chip in a terminal device. The apparatus has a function of implementing the method in the first aspect. The function may be implemented by hardware, or may be implemented by hardware executing corresponding software. The hardware or the software includes one or more modules corresponding to the function. The apparatus includes a processing unit and a storage unit. The processing unit may process information based on an instruction, a program, data, and the like that are stored in the storage unit, so that the apparatus implements the method in the first aspect.

In an optional design, when the apparatus is the terminal device, the terminal device includes a processing unit and a storage unit. The processing unit may be a processor, and the storage unit may be a memory. The storage unit is configured to store a computer execution instruction, the processing unit is connected to the storage unit, and the processing unit executes the computer execution instruction stored in the storage unit, to perform the following operations:

enabling a high-speed railway function; obtaining path information; determining a first target cell based on the path information; and reporting a first measurement report when a measurement value of a source cell meets a second threshold, where the first measurement report is used to trigger a network side device to control the terminal device to hand over from the source cell to the first target cell; and the source cell is a cell on which the terminal device camps, the second threshold is greater than a first threshold, and the first threshold is a threshold that is indicated by the network side device and that is used to trigger the processor to report a measurement report.

Optionally, after reporting the first measurement report, the processor is further configured to perform the following operations: receiving a handover command sent by the network side device, where the handover command is used to instruct the processor to hand over from the source cell to the first target cell; and handing over from the source cell to the first target cell in response to the handover command, where the terminal device camps on the first target cell after the handover.

Optionally, the measurement value is a reference signal received power RSRP, a received signal strength indicator RSSI, or reference signal received quality RSRQ.

Optionally, the path information includes a handover sequence of a plurality of nodes on a movement path of the terminal device and information about each of the plurality of nodes; and the information about each node includes an identifier of the node and identifiers of a plurality of cells in the node.

Optionally, the first target cell is a cell in a next node of a node in which the source cell is located.

Optionally, the information about each node includes handover priorities of the plurality of cells in the node, and the first target cell is a cell that has a highest priority and that is detected by the processor in the next node.

Optionally, the processor is further configured to perform the following operations: determining a second target cell based on the path information, where the second target cell is a cell in a previous node of the node in which the source cell is located; and reporting a second measurement report when the measurement value of the source cell meets a third threshold, where the second measurement report is used to trigger the network side device to control the processor to hand over from the source cell to the second target cell, and the third threshold is less than the first threshold.

Optionally, that the processor obtains path information specifically includes: locally obtaining the pre-stored path information; or receiving the path information sent by the network side device.

Optionally, that the processor obtains path information specifically includes: obtaining a path information set, where the path information set includes path information of a plurality of paths, and the plurality of paths include the movement path of the terminal device; and the processor is further configured to perform the following operations:

determining, based on the path information of the plurality of paths, a plurality of target nodes of the node in which the source cell is located; and when the terminal device determines that a detected cell includes a cell belonging to one of the plurality of target nodes but does not include a cell belonging to a node other than the one of the plurality of target nodes, determining that the one target node is the next node.

Optionally, the information about each node further includes a frequency coverage area and a transmission mode of each of the plurality of cells in the node; and the processor is further configured to perform the following operations:

determining a cell that meets a camping condition in a plurality of cells in the node in which the source cell is located, where the camping condition is that a frequency division duplex mode is used and a frequency coverage area has a highest priority; and reporting a third measurement report when the cell that meets the camping condition is not the source cell, where the third measurement report is used to trigger the network side device to control the processor to hand over from the source cell to the cell that meets the camping condition.

Optionally, all cells recorded in the path information are cells on a high-speed railway dedicated network; and when the terminal device is in an idle mode in a high-speed movement process, the processor is further configured to perform the following operations: when performing cell reselection, determining, based on the path information, that a detected neighboring cell of the source cell is a cell on the high-speed railway dedicated network, and controlling the terminal device to camp on the neighboring cell.

Optionally, the processor is further configured to perform the following operation: if the terminal device detects a 2G/3G signal, and signal quality of the source cell meets a condition for providing a service for the terminal device, delaying requesting the network side device to hand over the terminal device to a 2G/3G network.

Optionally, the processor is further configured to perform the following operation: reporting handover information after the terminal device reaches an end point of the movement path, where the handover information includes an identifier of a source cell and an identifier of a target cell in each handover performed by the processor in a process in which the terminal device moves along the movement path, and the handover information is to be used by the network side device to optimize the path information.

Optionally, the first threshold is a threshold in an A3 event, a threshold in an A5 event, a threshold in a B1 event, or a threshold in a B2 event.

In another possible design, when the apparatus is the chip in the terminal device, the chip includes a processing unit and a storage unit. The processing unit may be a processor, and the storage unit is a storage unit in the chip, for example, a register or a cache, or the storage unit may be a storage unit that is in the terminal and that is located outside the chip, for example, a read-only memory (read-only memory, ROM) or another type of static storage device that can store static information and an instruction, or a random access memory (random access memory, RAM). The processing unit may execute a computer execution instruction stored in the storage unit, so that the chip in the terminal performs the method in any item of the first aspect.

For technical effects of the apparatus provided in this application, refer to technical effects of the first aspect or the implementations of the first aspect. Details are not described herein again.

The processor mentioned above may be a general-purpose central processing unit (CPU), a microprocessor, an application-specific integrated circuit (application-specific integrated circuit, ASIC), or one or more integrated circuits configured to control program execution of the method in the second aspect.

According to a third aspect, an embodiment of this application provides a computer storage medium. The computer storage medium stores a program used to implement the method in the first aspect.

According to a fourth aspect, an embodiment of this application provides a computer program product. The program product includes a program, and when the program is run, the method in the first aspect is performed.

DESCRIPTION OF EMBODIMENTS

Generally, in a high-speed railway mobile communications system, a terminal device moves at a high speed along with a high-speed train. Therefore, the terminal device needs to perform cell handover at a high frequency. According to a conventional cell handover mechanism, the terminal device needs to perform cell measurement based on control information delivered by a network side device. Then, a measurement report is reported when a measurement result reaches a threshold indicated by the network side device, to trigger the network side device to deliver a handover instruction, so as to control the terminal device to hand over from a serving cell to a neighboring cell. However, because the terminal device moves at the high speed on the high-speed railway, when the terminal device just determines that the measurement result reaches the threshold indicated by the network side device and reports the measurement report, a signal in the serving cell is attenuated to a degree that a service cannot be provided for the terminal device, and the terminal device has not been handed over to a target cell in time. Consequently, the terminal device is disconnected, and an RRC link needs to be re-established.

This application provides a terminal device with a high-speed railway mode, so that in a high-speed movement scenario, a handover can be triggered in advance, to ensure that the terminal device is handed over to a target cell before a signal in a source cell is attenuated to a degree that a service cannot be provided, thereby avoiding problems of a service drop and re-establishment caused by a handover timeout, and reducing a service drop rate and a re-establishment rate.

Figure 1:
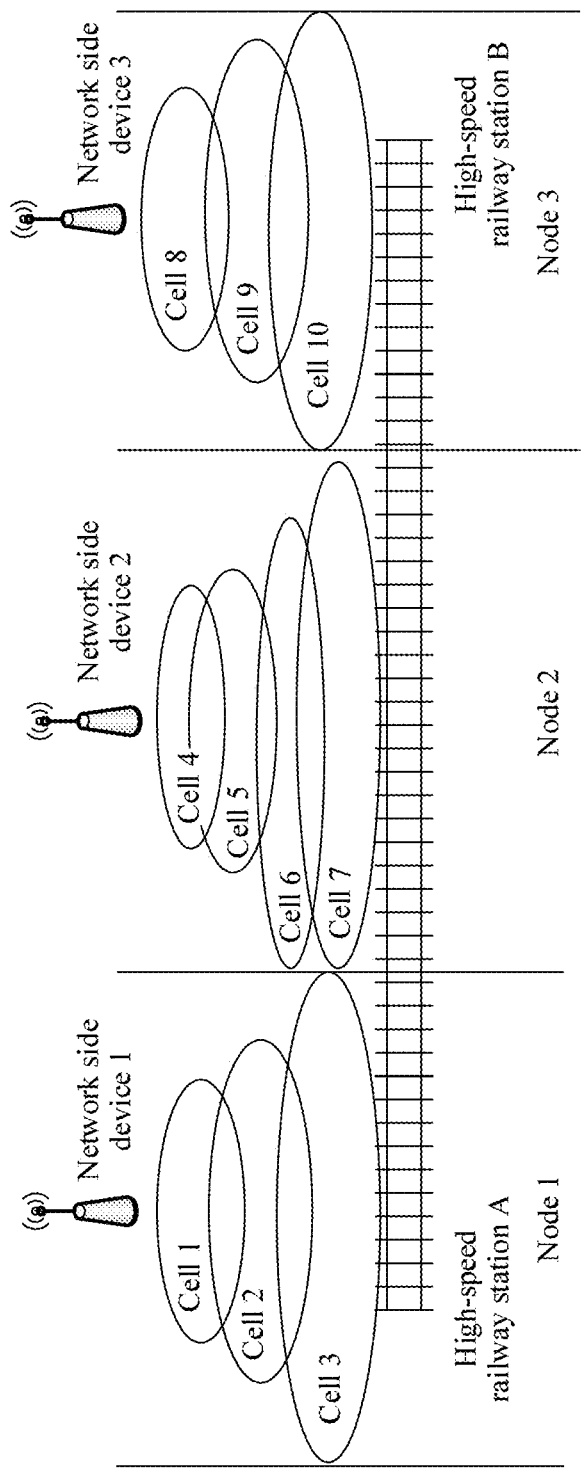
FIG. 1 is a schematic diagram of a cell coverage scenario on a high-speed railway line according to this application.

A high-speed railway line shown in FIG. 1 is used as an example to first describe nodes in this application.

As shown in FIG. 1, the high-speed railway line from a high-speed railway station A to a high-speed railway station B is covered by a plurality of cells, and is used to provide a service for a terminal device moving on the high-speed railway line. For example, the high-speed railway line is covered by 10 cells (which are respectively a cell 1 to a cell 10). In this application, node division may be performed on the plurality of cells based on area division on the high-speed railway line. For example, each 10 km road section in the high-speed railway line is an area, and cells that provide signal coverage in a same area are classified as a node. Alternatively, a plurality of areas in the high-speed railway line are determined based on coverage areas of the cells. For example, the high-speed railway line from the high-speed railway station A to the high-speed railway station B may be completely covered by at least three cells (the cell 1, the cell 7, and the cell 10). In this case, the high-speed railway line may be divided into three areas based on coverage areas of the three cells, and then cells (the cell 1 to the cell 3) that provide signal coverage in a coverage area of the cell 1 are classified as a node, cells (the cell 4 to the cell 7) that provide signal coverage in a coverage area of the cell 7 are classified as a node, and cells (the cell 8 to the cell 10) that provide signal coverage in a coverage area of the cell 10 are classified as a node.

The cell shown in FIG. 1 may include a cell that supports a 4th generation (fourth generation, 4G) access technology, for example, a cell that supports a long term evolution (long term evolution, LTE) access technology; or may include a cell that supports a 5th generation (fifth generation, 5G) access technology, for example, a cell that supports a new radio (new radio, NR) access technology; or may include a cell that supports a plurality of radio technologies, for example, a cell that supports an LTE technology and an NR technology. In addition, the cell in FIG. 1 may alternatively be a cell applicable to a future-oriented communications technology.

It should be noted that when an ordinal number such as "first", "second", or "third" is mentioned in this application, it should be understood that the ordinal number is merely used for distinguishing unless the ordinal number definitely represents a sequence based on a context.

Figure 2:
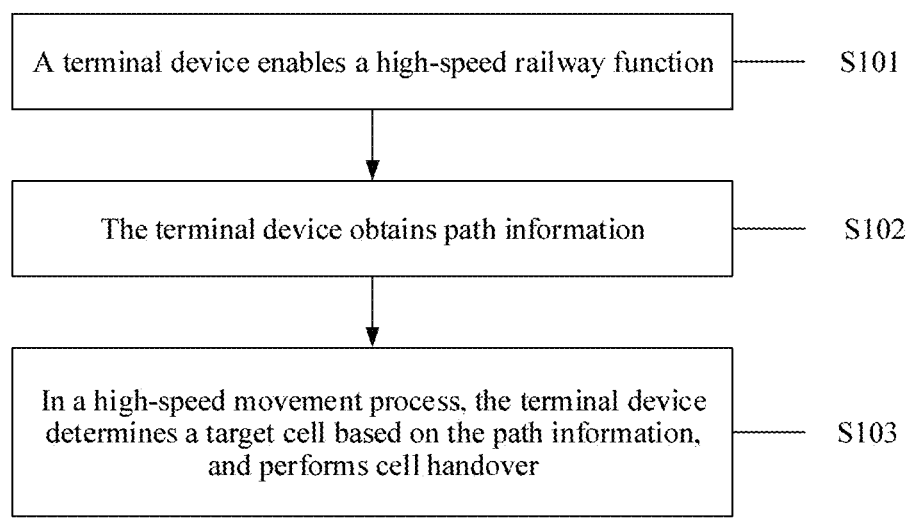
FIG. 2 is a flowchart 1 of an embodiment of a cell handover method in a high-speed movement scenario according to this application.

FIG. 2 is a flowchart of an embodiment of a cell handover method in a high-speed movement scenario according to this application. The method may include the following steps.

S101: A terminal device enables a high-speed railway function.

This application provides the terminal device with a high-speed railway mode. When the terminal device is in the high-speed railway mode, the high-speed railway function of the terminal device is enabled, so that a handover policy provided by the high-speed railway function in the high-speed movement scenario can be implemented.

In this application, the high-speed railway mode of the terminal device may be manually or automatically enabled.

Figure 3C:
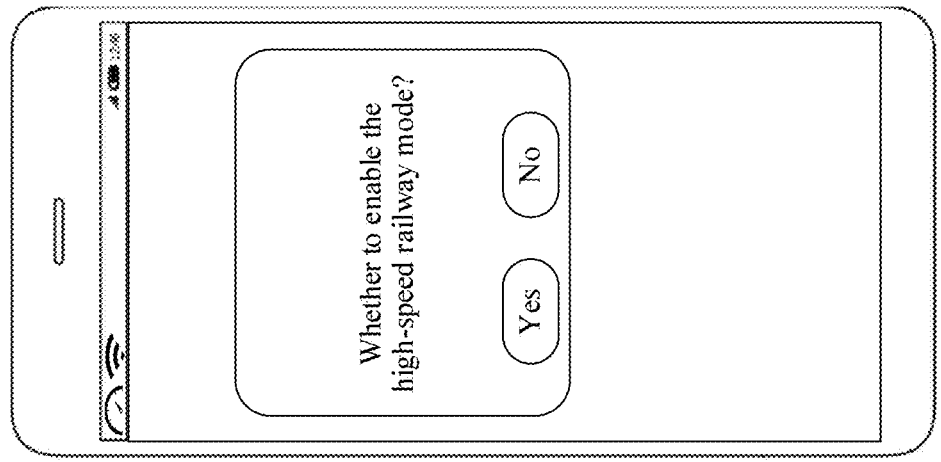
FIG. 3(a), FIG. 3(b) and FIG. 3(c) are a schematic diagram 1 of a display interface according to this application.
Figure 3B:
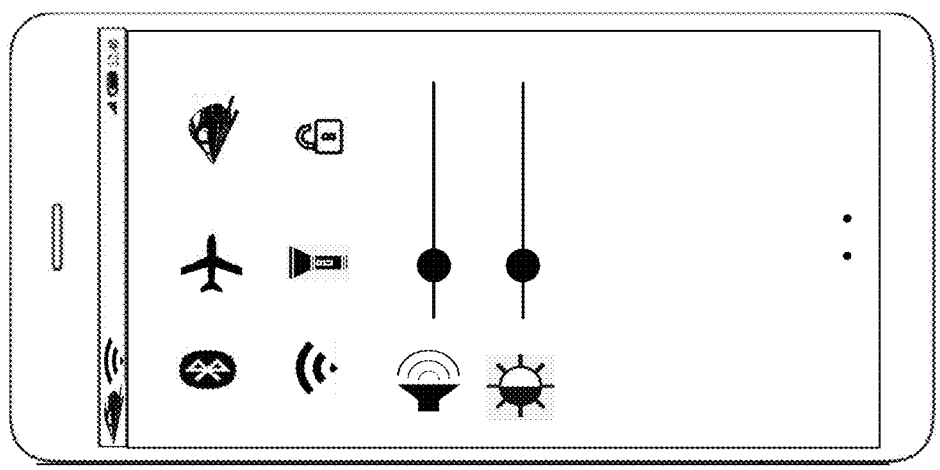
Figure 3A:
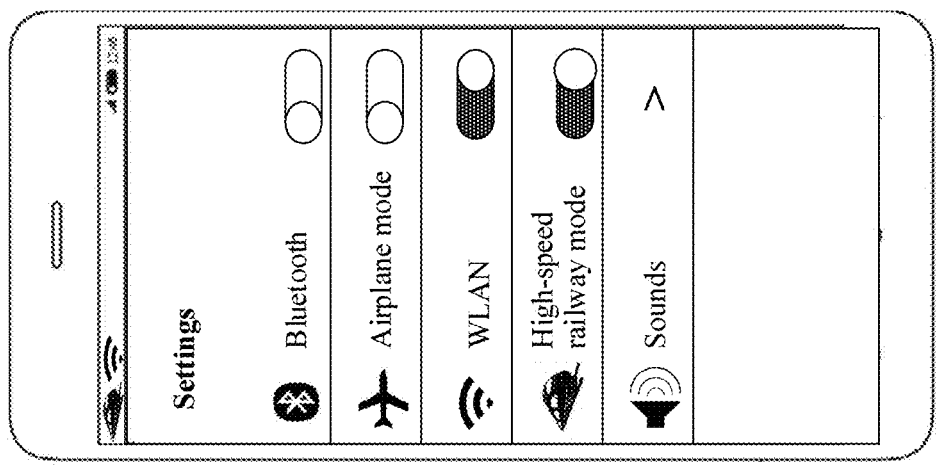

In an example, the terminal device may display a menu bar and/or an icon of the high-speed railway mode, to provide a function of manually enabling the high-speed railway mode by a user. For example, as shown in FIG. 3(a), the terminal device may display the menu bar of the high-speed railway mode in a setting interface. The setting interface may further include conventional setting menu bars, for example, menu bars of Bluetooth, Airplane mode, WLAN, and Sounds. Alternatively, as shown in FIG. 3(b), the terminal device may display the icon of the high-speed railway mode in a shortcut control interface. The shortcut control interface may further include icons of conventional functions, for example, icons of Bluetooth, Airplane mode, WLAN, Brightness, Sounds, Flashlight, and Lock screen, and the icons are used to implement shortcut operations of related functions.

When the terminal device detects, in the setting interface or the shortcut control interface, a related operation performed by the user (for example, detects a corresponding touch operation or tap operation performed by the user), and determines that the high-speed railway mode needs to be enabled, the terminal device may query, in a pop-up window, the user whether to determine to enable the high-speed railway mode. For example, when the terminal device detects that an on/off button of the menu bar of the high-speed railway mode shown in FIG. 3(a) is enabled, or detects that the icon of the high-speed railway mode shown in FIG. 3(b) is illuminated, the terminal device may display a pop-up window shown in FIG. 3(c), and display query information "Whether to enable the high-speed railway mode?" and selection buttons "Yes" and "No". When the terminal device detects that the user taps "Yes", the terminal device enables the high-speed railway mode.

Figure 4A:
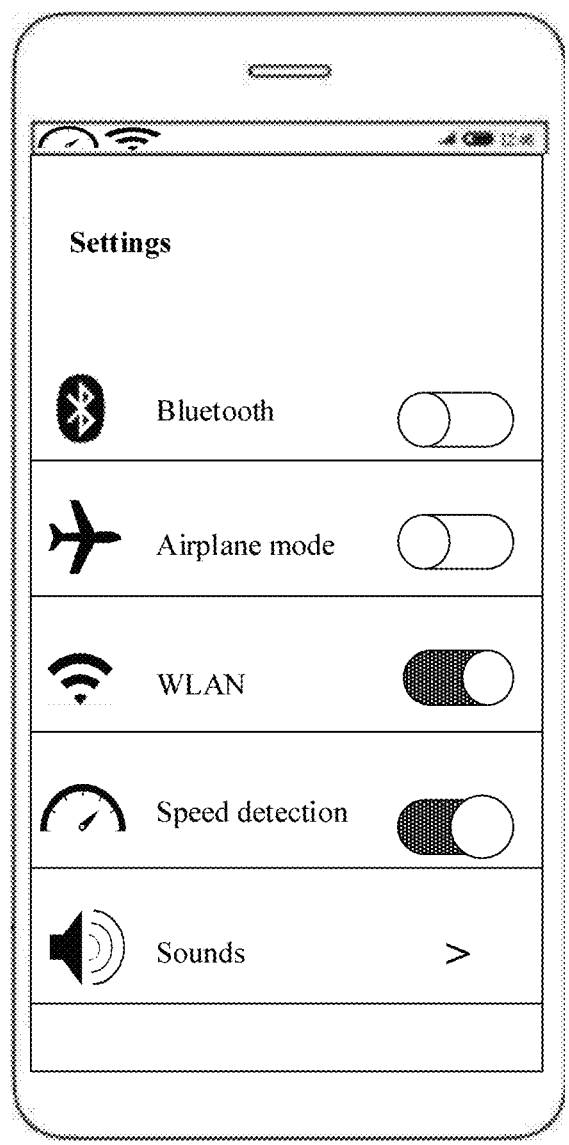
FIG. 4(a) and FIG. 4(b) are a schematic diagram 2 of a display interface according to this application.
Figure 4B:
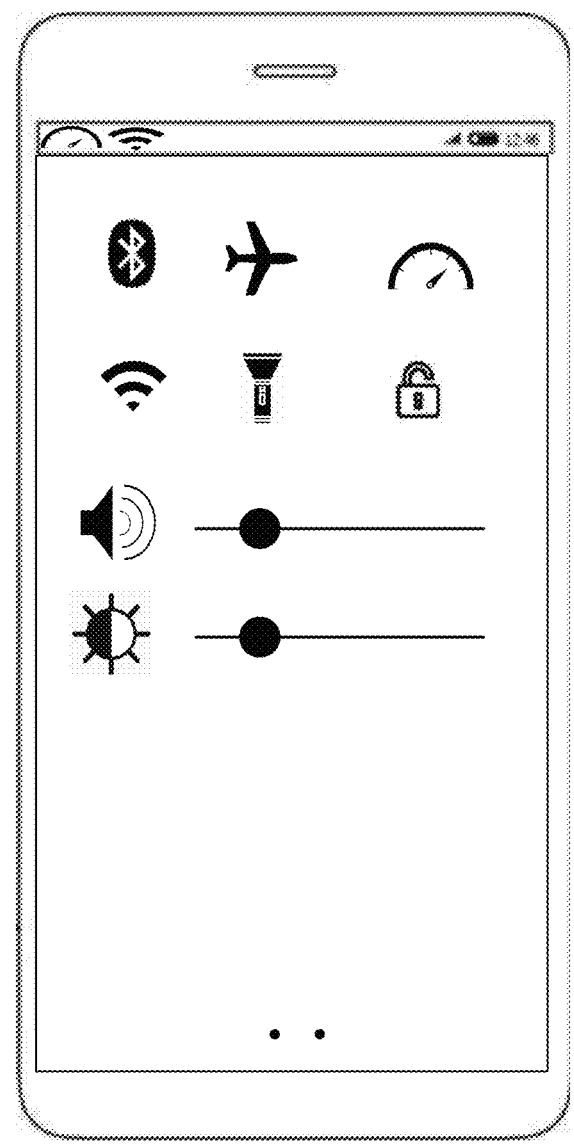

In an example, the terminal device may further display a menu bar and/or an icon of speed detection, to provide a function of automatically detecting a speed. For example, as shown in FIG. 4(a), the terminal device may display the menu bar of the speed detection in a setting interface. When the terminal device detects that the user enables an on/off button of the menu bar of the speed detection in the setting interface, the terminal device may start to detect a moving speed of the terminal device in real time. Alternatively, as shown in FIG. 4(b), the terminal device may display the icon of the speed detection in a shortcut control interface. When the terminal device detects that the user selects the icon of the speed detection in the shortcut control interface, the terminal device may start to detect a moving speed of the terminal device in real time.

For example, the terminal device may measure a moving speed in real time by using a built-in positioning system, for example, a global positioning system (global positioning system, GPS), a BeiDou navigation satellite system (BeiDou navigation satellite system, BDS), a GLONASS (GLONASS) satellite navigation system, or a Galileo satellite navigation system (Galileo satellite navigation system). Alternatively, after the terminal device is located on a high-speed train, the terminal device may establish a short-distance communication connection to the high-speed train by using a short-distance communications technology, for example, Bluetooth (Bluetooth), wireless fidelity (wireless fidelity, Wi-Fi), near field communication (near field communication, NFC), a HiLink protocol, or a light fidelity (light fidelity, Li-Fi) technology, and then obtain speed information shared by the high-speed train, to determine a moving speed of the terminal device, and the like.

Figure 5A:
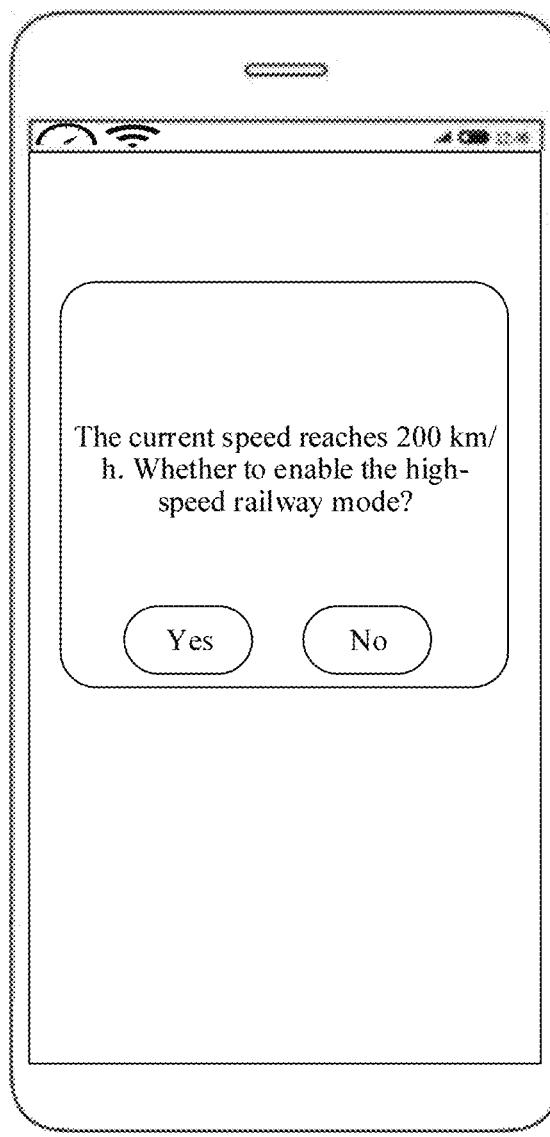
FIG. 5(a) and FIG. 5(b) are a schematic diagram 3 of a display interface according to this application.

When detecting that the moving speed of the terminal device exceeds a first threshold and this case lasts for a specific time, the terminal device may display, in a pop-up window, information for querying whether to enable the high-speed railway mode, to query the user whether to enable the high-speed railway mode. For example, as shown in FIG. 5(a), when detecting that the speed reaches 200 km/h, the terminal device displays, in a pop-up window, query information "The current speed reaches 200 km/h. Whether to enable the high-speed railway mode?" and selection buttons "Yes" and "No". When the terminal device detects that the user taps "Yes", the terminal device enables the high-speed railway mode.

Alternatively, when the terminal device detects that the moving speed exceeds a first threshold and this case lasts for a specific time, the terminal device may automatically enable the high-speed railway mode without a need to query the user in a pop-up window.

Optionally, after the terminal device enables the high-speed railway mode, if the terminal device detects that the moving speed is less than a second threshold (where the second threshold may be less than the first threshold) and this case lasts for a specific time, the terminal device may autonomously disable the high-speed railway mode, or query, in a pop-up window, the user whether to disable the high-speed railway mode.

Figure 5B:
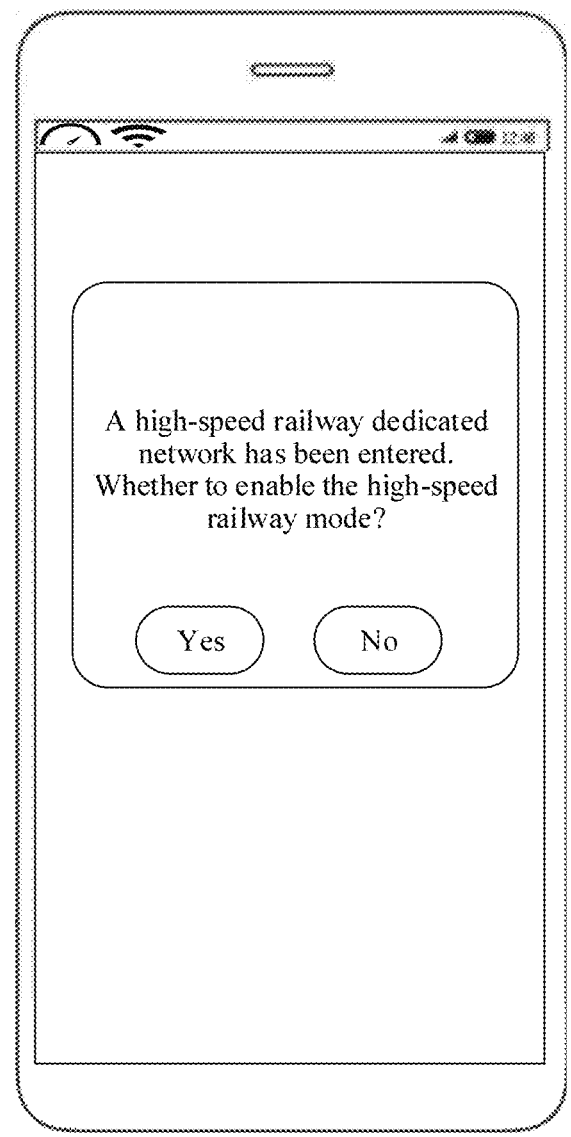

In an example, the terminal device may further autonomously detect a high-speed railway dedicated network. When detecting the high-speed railway dedicated network, the terminal device may autonomously enable the high-speed railway mode, or may query, by displaying a pop-up window, the user whether to enable the high-speed railway mode. For example, as shown in FIG. 5(b), when detecting the high-speed railway dedicated network, the terminal device displays, in a pop-up window, query information "A high-speed railway dedicated network has been entered. Whether to enable the high-speed railway mode?" and selection buttons "Yes" and "No". When the terminal device detects that the user taps "Yes", the terminal device enables the high-speed railway mode.

In this application, after the terminal device enables the high-speed railway mode, the high-speed railway function of the terminal device is enabled. In this way, the terminal device may obtain path information, then determine a target cell based on the path information and the handover policy provided by the high-speed railway function, and perform cell handover.

S102: The terminal device obtains the path information.

The path information obtained by the terminal device includes at least path information of a movement path of the terminal device. Specifically, path information of a path may include a handover sequence of a plurality of nodes on the path and information about each node. The information about the node may include an identifier of the node and identifiers that are of a plurality of cells and that correspond to the identifier of the node. The identifier of the cell may be an identifier used to uniquely identify the cell, for example, a cell ID (cell identification) of the cell or an ECI of the cell. The ECI is an ID including an ID of an eNodeB (eNodeB) to which the cell belongs and the cell ID of the cell.

It may be understood that a correspondence between the identifier of the node and the identifier of the cell is carried in the information about the node, to indicate the node to which the cell belongs.

For example, based on the scenario shown in FIG. 1, when the movement path of the terminal device is the high-speed railway line 1 from the high-speed railway station A to the high-speed railway station B, the path information obtained by the terminal device includes at least path information of the high-speed railway line 1. The path information of the high-speed railway line 1 includes information about three nodes and a handover sequence of the three nodes. For example, the information about the three nodes may be shown in Table 1.

TABLE 1

| Node identifier | Cell identifier |
|---|---|
| Node 1 | Cell 1 |
|  | Cell 2 |
|  | Cell 3 |
| Node 2 | Cell 4 |
|  | Cell 5 |
|  | Cell 6 |
|  | Cell 7 |
| Node 3 | Cell 8 |
|  | Cell 9 |
|  | Cell 10 |

The handover sequence of the three nodes in Table 1 is: the node 1→the node 2→the node 3, where→represents a handover direction. To be specific, when moving at a high speed on the high-speed railway line 1, the terminal device is handed over from a cell in the node 1 to a cell in the node 2, and is handed over from the cell in the node 2 to a cell in the node 3.

The terminal device may determine, based on the handover sequence of the nodes and the identifiers that are of the cells and that correspond to the identifier of each node in the path information, a node (a current node) in which a cell on which the terminal device currently camps is located, a cell in the current node, a next node that is to be entered, a cell in the next node, a previous node of the current node, and a cell in the previous node, so that when being handed over between adjacent nodes, the terminal device determines a node in which a detected cell is located, to determine a to-be-used handover policy.

For example, the terminal device currently camps on the cell 3, and determines, based on the path information, that the cell 3 belongs to the node 1 and the next node that is to be passed through is the node 2, where the node 2 includes the cell 4, the cell 5, and the cell 6. When detecting any cell in the node 2, the terminal device may prepare to hand over to the cell in the node 2 in advance.

Optionally, the information about each node may further include a handover priority of each cell in the node, so that when detecting a plurality of cells that belong to the next node, the terminal device can select, based on priority information, a cell with a highest priority for handover.

Optionally, the information about each node may further include information such as a frequency coverage area and a used transmission mode (for example, an FDD mode or a TDD mode) of each cell in the node, so that the terminal device chooses to camp on an optimal cell (for example, a cell that uses the FDD mode and that has a largest frequency coverage area) in the node. For example, the information about the three nodes in the high-speed railway line 1 may be further shown in Table 2.

TABLE 2

| Node identifier | Cell identifier | Frequency coverage area | FDD/TDD | Handover priority |
|---|---|---|---|---|
| Node 1 | Cell 1 | 1 kilometer (km) | TDD | 3 |
|  | Cell 2 | 5 km | TDD | 2 |
|  | Cell 3 | 15 km | FDD | 1 |

TABLE 2-continued

| Node identifier | Cell identifier | Frequency coverage area | FDD/TDD | Handover priority |
|---|---|---|---|---|
| Node 2 | Cell 4 | 1 km | TDD | 4 |
| | Cell 5 | 5 km | TDD | 3 |
| | Cell 6 | 13 km | FDD | 2 |
| | Cell 7 | 15 km | FDD | 1 |
| Node 3 | Cell 8 | 2 km | TDD | 3 |
| | Cell 9 | 10 km | TDD | 2 |
| | Cell 10 | 15 km | FDD | 1 |

In this application, the terminal device may obtain the path information in a plurality of manners.

In an example, a network device may actively push the path information to the terminal device that enables the high-speed railway mode. To be specific, after the terminal device enables the high-speed railway mode and accesses the high-speed railway dedicated network, the terminal device may receive the path information pushed by the network device. The pushed path information may be a path information set, the path information set includes path information of a plurality of paths, and the plurality of paths include the movement path of the terminal device.

For example, the terminal device is located in the high-speed railway station A, and accesses a cell, for example, the cell 1, on a high-speed railway dedicated network that covers the high-speed railway station A. The cell 1 detects that the terminal device enables the high-speed railway mode, and the cell 1 pushes the path information set to the terminal device. The path information may include path information corresponding to each high-speed railway line starting from the high-speed railway station A.

Figure 6:
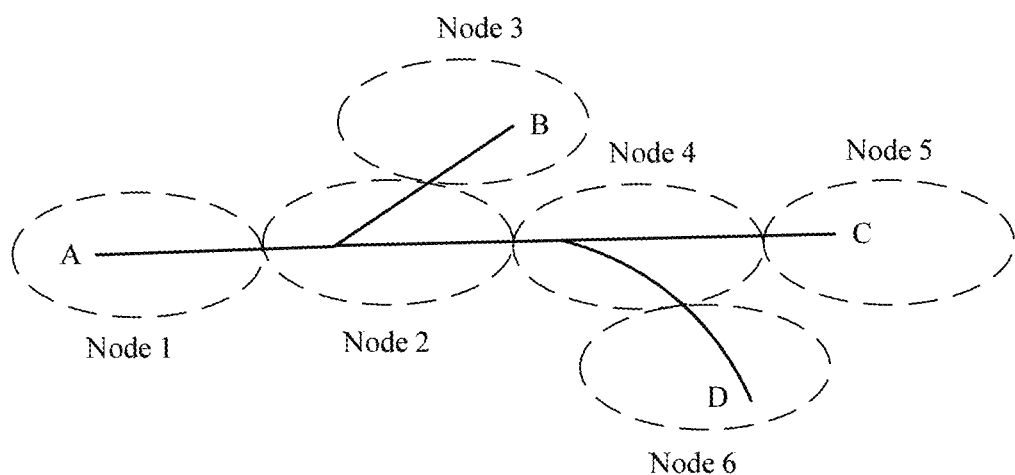
FIG. 6 is a schematic diagram of a high-speed railway line according to this application.

For example, as shown in FIG. 6, there are three paths in total that start from a high-speed railway station A, which are respectively a high-speed railway line 1 from the high-speed railway station A to a high-speed railway station B, a high-speed railway line 2 from the high-speed railway station A to a high-speed railway station C, and a high-speed railway line 3 from the high-speed railway station A to a high-speed railway station D. There are three nodes on the high-speed railway line 1. In a direction from the high-speed railway station A to the high-speed railway station B, a handover sequence of the nodes is: a node 1→a node 2→a node 3. There are four nodes on the high-speed railway line 2. In a direction from the high-speed railway station A to the high-speed railway station C, a handover sequence of the nodes is: the node 1→the node 2→a node 4→a node 5. There are four nodes on the high-speed railway line 3. In a direction from the high-speed railway station A to the high-speed railway station D, a handover sequence of the nodes is: the node 1→the node 2→the node 4→a node 6.

Based on the high-speed railway lines shown in FIG. 6, when the terminal device is located in the high-speed railway station A and enables the high-speed railway mode, the path information pushed by the network side device includes path information of the high-speed railway line 1, the high-speed railway line 2, and the high-speed railway line 3. The high-speed railway line 1 is the movement path of the terminal device.

In an example, the terminal device may pre-store corresponding path information. After enabling the high-speed railway mode, the terminal device may locally search for the corresponding path information based on a location of the terminal device. The path information stored in the terminal device may alternatively be a path information set.

For example, based on the high-speed railway lines shown in FIG. 6, if the terminal device detects that the terminal device is located in the high-speed railway station A, the terminal device may search the locally stored path information for a path information set corresponding to the high-speed railway station A. The path information set corresponding to the high-speed railway station A may include path information of a plurality of high-speed railway lines starting from the high-speed railway station A, for example, include path information of the high-speed railway line 1, the high-speed railway line 2, and the high-speed railway line 3. The high-speed railway line 1 is the movement path of the terminal device.

In an example, the terminal device may request path information from the network side device. For example, after the terminal device enables the high-speed railway mode, the terminal device is allowed to read an SMS message notification sent by a railway service center, to obtain travel information that is of the terminal device and that includes a train number. The terminal device sends request information carrying the train number to the network side device, to request the network side device to deliver path information corresponding to the train number.

For example, if a high-speed railway line corresponding to the train number obtained by the terminal device is the high-speed railway line 1, the network side device delivers path information of the high-speed railway line 1 to the terminal device, so that the terminal device can obtain an accurate high-speed railway line.

S103: In a high-speed movement process, the terminal device determines a target cell based on the path information, and performs cell handover.

In this application, the high-speed railway function of the terminal device provides three handover policies. A first handover policy is used by the terminal device to implement an advance handover between two adjacent nodes. A second handover policy is used by the terminal device to implement a delayed handover between two adjacent nodes, to avoid a ping-pong handover. A third handover policy is used by the terminal device to implement an advance handover between different cells in a node.

In an example, the first handover policy may be specifically as follows: When the terminal device detects a first target cell (the cell in the next node) based on the path information, the terminal device measures signals in a source cell (the cell on which the terminal device currently camps) and the first target cell based on a second threshold (less than a first threshold), and reports a first measurement report when a measurement value of the source cell meets the second threshold, to trigger the network side device in advance to control the terminal device to hand over from the source cell to the first target cell.

The first threshold is a threshold that is indicated by the network side device and that is used to trigger reporting of a measurement report, for example, a reference signal received power (reference signal receiving power, RSRP), a received signal strength indicator (received signal strength indicator, RSSI), or reference signal received quality (reference signal receiving quality, RSRQ). After a radio resource control (radio resource control, RRC) link to the network side device is established, the network side device delivers control information by using RRC signaling. The control information includes the first threshold configured by the network side device.

The first threshold may be a threshold that is in a handover event used to trigger a cell handover and that is configured by the network side device. In an example of a handover event in an LTE system, the first threshold may be a threshold in an A3 event, a threshold in an A5 event, a threshold in a B1 event, a threshold in a B2 event, or the like. For definitions of the A3 event, the A5 event, the B1 event, and the B2 event, refer to definitions in the 3rd generation partnership project (3rd generation partnership project, 3GPP) 36.331. Details are not described herein.

In this application, when the terminal device enables the high-speed railway function, the terminal device may obtain a pre-configured first offset, and modify the first threshold based on the first offset to obtain the second threshold, where the obtained second threshold is greater than the first threshold. Therefore, in an attenuation process, a signal level of the source cell is more likely to meet a requirement of the second threshold compared with the first threshold. When being handed over to the first target cell, the terminal device performs cell measurement based on the second threshold, and reports the first measurement report when a measurement result reaches the second threshold, instead of reporting the first measurement report only when the measurement result reaches the first threshold, to trigger the network side device in advance to deliver a handover command, so as to control the terminal device to hand over to the target cell.

Figure 7:
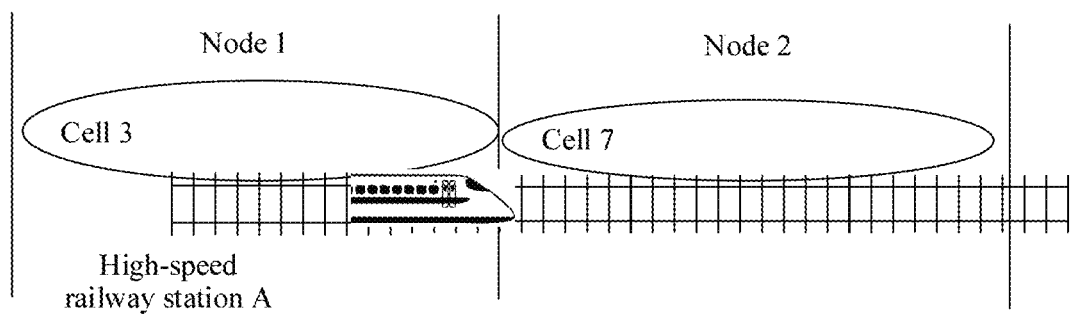
FIG. 7 is a schematic diagram 1 in which a terminal device moves along a high-speed railway line according to this application.

For example, based on FIG. 1, as shown in FIG. 7, the terminal device currently camps on the cell 3 in the node 1 and moves at a high speed. When the terminal device reaches an edge of the cell 3 and detects a signal in the cell 7 in the node 2, the terminal device may perform cell measurement based on the second threshold. When measurement results of the cell 3 and the cell 7 reach the second threshold, the terminal device reports the first measurement report in advance, to trigger the network device to deliver a handover command, so as to complete a handover from the cell 3 to the cell 7.

For example, it is assumed that the first threshold delivered by the network side device is the threshold in the A3 event, and is 3 dB. When it is indicated that an RSRP of the target cell is 3 dB greater than an RSRP of the source cell, or an RSRP of the source cell is 3 dB less than an RSRP of the target cell, the terminal device reports the first measurement report, to trigger the network side device to deliver a handover instruction, so as to control the terminal device to complete a handover from the source cell to the target cell.

A first offset that is configured in the terminal device for the high-speed railway mode and that corresponds to the A3 event is 5 dB. In this case, after enabling the high-speed railway function, the terminal device subtracts the first offset from the first threshold to obtain the second threshold −2 dB. To be specific, in the high-speed railway mode, when the target cell is the first target cell, a decision condition of the A3 event is changed to: The RSRP of the first target cell is 2 dB less than the RSRP of the source cell. To be specific, when the RSRP of the source cell is 2 dB greater than the RSRP of the target cell, the second threshold is greater than the first threshold for the source cell. For example, when the RSRP of the first target cell is 3 dB, the terminal device does not need to wait until the RSRP of the source cell is 3 dB less than the RSRP of the first target cell (that is, the RSRP of the source cell is attenuated to 0 dB) before reporting the first measurement report, but reports the first measurement report when the RSRP of the source cell is 2 dB greater than the RSRP of the first target cell (that is, the RSRP of the source cell is attenuated to 5 dB). Therefore, the terminal device reports the first measurement report in advance, to trigger the network side device in advance to deliver a handover instruction, so as to control the terminal device to complete a handover from the source cell to the target cell in advance.

For example, it is assumed that the first threshold delivered by the network side device is a threshold 1 in the A5 event, the threshold 1 in the A5 event is 0 dB, and a threshold 2 is 3 dB. It indicates that when the network side device indicates that the RSRP of the source cell is less than 0 dB (the threshold 1) and the RSRP of the target cell is greater than 3 dB (the threshold 2), the terminal device reports the first measurement report, to trigger the network side device to deliver a handover instruction, so as to control the terminal device to complete a handover from the source cell to the target cell.

A first offset that is configured in the terminal device for the high-speed railway mode and that corresponds to the A5 event is 3 dB, and the first offset is for the threshold 1. In this case, after enabling the high-speed railway function, the terminal device adds the first offset and the first threshold to obtain the second threshold 3 dB for the RSRP of the source cell, where the second threshold is greater than the first threshold. To be specific, in the high-speed railway mode, a decision condition of the event A5 is changed to: The RSRP of the source cell is less than 3 dB and the RSRP of the target cell is greater than 3 dB. To be specific, when the terminal device is handed over to the first target cell, the terminal device does not need to wait unit the RSRP of the source cell is attenuated to 0 dB before reporting the first measurement report, but may report the first measurement report in advance when the RSRP of the source cell is attenuated to 3 dB, to trigger the network side device in advance to deliver a handover instruction, so as to control the terminal device to complete a handover from the source cell to the first target cell in advance.

Figure 8:
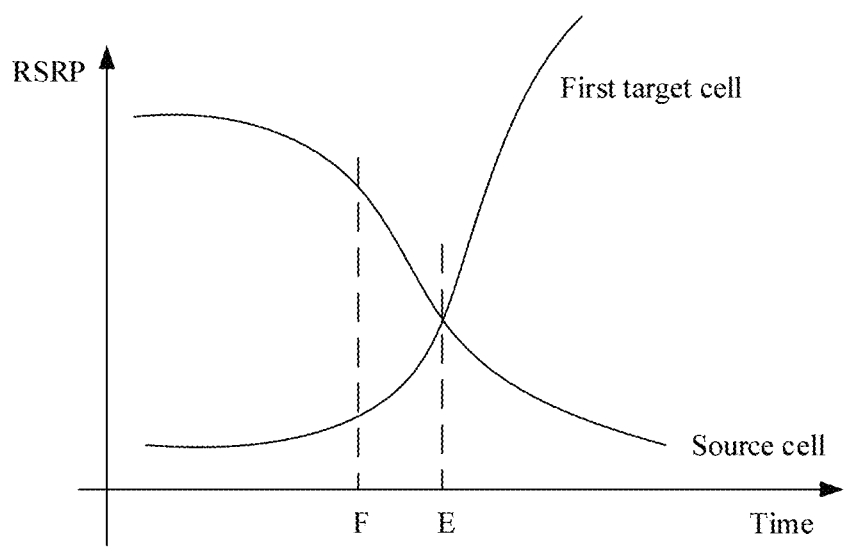
FIG. 8 is a schematic diagram of comparison between handover moments according to this application.

It should be noted that based on the foregoing examples, when measurement results of the source cell and the first target cell reach the second threshold, the measurement results of the source cell and the first target cell cannot reach the first threshold. Therefore, a handover moment that meets the second threshold is earlier than a handover moment that meets the first threshold. For example, as shown in FIG. 8, a point E represents a handover moment that meets the first threshold, and a point F represents a handover moment that meets the second threshold. Therefore, in a high-speed movement process, when performing cell handover between nodes, the terminal device can perform cell measurement based on the second threshold, to trigger the cell handover in advance, so as to ensure that the terminal device is handed over to the first target cell before a signal in the source cell is attenuated to a degree that a service cannot be provided, thereby avoiding problems of a service drop and re-establishment caused by a handover timeout, and reducing a service drop rate and a re-establishment rate in a high-speed movement scenario.

Optionally, when the terminal device detects the first target cell, the terminal device may further subtract a preset amount from a measurement value of the source cell, to obtain a corrected measurement value. Then, the terminal device determines whether the corrected measurement value meets the first threshold, and reports a measurement report when the corrected measurement value meets the first threshold.

For example, it is assumed that the first threshold delivered by the network side device is a threshold 1 in the A5 event, the threshold 1 in the A5 event is 0 dB, and a threshold 2 is 3 dB. It indicates that the terminal device reports the first measurement report when the network side device indicates that the RSRP of the source cell is less than 0 dB and the RSRP of the target cell is greater than 3 dB.

A preset amount configured in the terminal device for the high-speed railway mode is 5 dB. In this case, after the terminal device enables the high-speed railway mode, each time the terminal device detects the RSRP of the source cell, the terminal device subtracts 5 dB from the measurement value, and then determines whether a corrected measurement value meets the first threshold. When the measured RSRP of the source cell is 5 dB, the RSRP is changed to 0 dB after correction, so that the corrected RSRP meets the first threshold, and the measurement report is reported. To be specific, the terminal device does not need to wait unit the RSRP of the source cell is attenuated to 0 dB before reporting the first measurement report, but may report the first measurement report in advance when the RSRP of the source cell is attenuated to 5 dB, to trigger the network side device in advance to deliver a handover instruction, so as to control the terminal device to complete a handover from the source cell to the first target cell in advance.

In an example, when the path information obtained by the terminal device is a path information set, the terminal device may perform path matching. To be specific, the terminal device may determine, based on path information of a plurality of paths that is in the path information set, a plurality of target nodes of the node in which the source cell is located. For example, the terminal device departs from the high-speed railway station A, and is handed over from the cell 3 in the node 1 to the cell 7 in the node 2. It can be learned based on the obtained path information that a next node may be the node 4 or the node 3. In other words, the node 3 and the node 4 are two target nodes.

When determining that a detected cell includes a cell belonging to one of the plurality of target nodes but does not include a cell belonging to a node other than the one of the plurality of target nodes, the terminal device determines that the one target cell is the next node. For example, when the terminal device reaches an edge of the cell 7 and detects the cell 10, the terminal device determines, based on the path information, that the cell 10 belongs to the node 3 but does not belong to the node 4. In this case, the terminal device determines that a next node that is to be passed through is the node 3.

Figure 9:
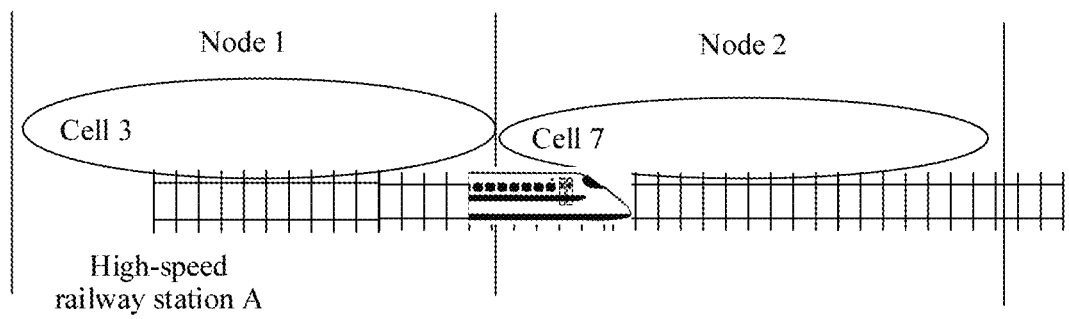
FIG. 9 is a schematic diagram 2 in which a terminal device moves along a high-speed railway line according to this application.

Optionally, when the terminal device is located between two adjacent nodes, a ping-pong handover may occur. For example, based on FIG. 7, as shown in FIG. 9, after the terminal device is handed over from the cell 3 in the node 1 to the cell 7 in the node 2, the terminal device is still at an edge of the cell 7 and can detect a signal in the cell 3. When the first threshold is met, the terminal device is handed over back to the cell 3, thereby causing a ping-pong handover.

When detecting a second target cell (the cell in the previous node), the terminal device may delay reporting a measurement report by executing the second handover policy, to avoid the ping-pong handover.

For example, the second handover policy may be as follows: When the terminal device detects a second target cell based on the path information, the terminal device measures signals in the source cell and the second target cell based on a third threshold (greater than the first threshold), and reports a second measurement report when a measurement value of the source cell meets the third threshold, to delay triggering the network side device to control the terminal device to hand over from the source cell to the second target cell.

In this application, when the terminal device enables the high-speed railway function, the terminal device may obtain a pre-configured second offset, and modify the first threshold based on the second offset to obtain the third threshold, where the obtained third threshold is less than the first threshold. Therefore, a moment at which a signal level of the source cell meets a requirement of the second threshold in an attenuation process is later than a moment at which the signal level of the source cell meets a requirement of the first threshold in the attenuation process. When the terminal device determines the detected second target cell based on the path information, the terminal device measures the source cell and the target cell based on the third threshold, and does not report the first measurement report when the measurement result reaches the first threshold, but reports the second measurement report when the measurement result reaches the third threshold, to delay a time of receiving the first measurement report by the network side device, thereby delaying triggering the network side device to deliver a handover command.

For example, it is assumed that the first threshold delivered by the network side device is the threshold in the A3 event, and is 3 dB. A second offset that is configured in the terminal device for the high-speed railway mode and that corresponds to the A3 event is 5 dB. In this case, after enabling the high-speed railway mode, the terminal device adds the second offset and the first threshold, to obtain the third threshold 8 dB. To be specific, in the high-speed railway mode, when the target cell is the second target cell, a decision condition of the A3 event is changed to: The RSRP of the target cell is 8 dB greater than the RSRP of the source cell. To be specific, when the RSRP of the source cell is 8 dB less than the RSRP of the target cell, the third threshold is less than the first threshold for the source cell. For example, when the RSRP of the first target cell is 8 dB, the terminal device does not report the second measurement report when the RSRP of the second target cell is 3 dB greater than the RSRP of the source cell (that is, the RSRP of the source cell is attenuated to 5 dB), but reports the second measurement report only when the RSRP of the second target cell is 8 dB greater than the RSRP of the source cell (that is, the RSRP of the source cell is attenuated to 0 dB). Therefore, the terminal device delays a time of reporting the second measurement report. Because the terminal device moves at a high speed, when measurement results of the source cell and the second target cell do not reach the third threshold, the terminal device may not measure a signal in the second target cell. Therefore, the terminal device is prevented from being handed over back to the cell in the previous node, to avoid a ping-pong handover.

Optionally, when the terminal device detects a 2G or 3G signal, if a current 4G signal can still ensure a normal service of the terminal device, the terminal device may also prevent, according to a policy for delaying triggering a handover, the terminal device from being handed over to a 2G/3G network.

For a plurality of cells in a same node, frequency coverage areas and transmission rates of the cells are different due to different frequency bands and different modes. In this application, the terminal device may autonomously choose, according to the third handover policy, to camp on a cell that is in the node and that meets a preset camping condition. For example, the camping condition may be that an FDD mode is used and a frequency coverage area has a highest priority. A larger frequency coverage area indicates a higher priority of the frequency coverage area of the cell and best signal quality (including uplink/downlink quality). For example, the camping condition may be specifically that a cell using an FDD mode is preferably selected, and then a cell with a largest frequency coverage area is selected. When two or more cells in the plurality of cells use an FDD mode and have a same frequency coverage area, the terminal device may select a cell with best signal quality (including uplink/downlink quality) from the two or more cells.

First, in a high-speed movement scenario, a rate of the FDD mode is supported by a rate of a TDD mode. Therefore, the terminal device may preferably select a cell using the FDD mode.

Then, when there are a plurality of cells using the FDD mode, the terminal device further chooses to camp on a cell with a largest frequency coverage area. The terminal device chooses to camp on a cell with a relatively large coverage area in the node, so that a handover frequency of the terminal device in a high-speed movement process can be effectively reduced.

For example, based on the high-speed railway line shown in FIG. 1, the terminal device departs from the high-speed railway station A. It is assumed that the terminal device first camps on the cell 1. When moving toward the high-speed railway station B, the terminal device is first handed over from the cell 1 to the cell 2 and then handed over from the cell 2 to the cell 3 based on a decision condition delivered by the network side device, for example, an A5 event or an A3 event, so that the terminal device can be handed over from the cell 3 to a cell in the node 2, for example, handed over to the cell 7. When moving in an area corresponding to the node 2, the terminal device may be handed over from the cell 7 to the cell 5 because the cell 5 meets the decision condition. Further, when the terminal device continues to move forward, the terminal device needs to be first handed over from the cell 5 to the cell 7, and then can be handed over to a cell in the node 3. Therefore, a quantity of handovers is relatively large. However, according to the second handover policy in this application, the terminal device may choose to camp on a cell with a largest frequency coverage area. For example, it is assumed that the terminal device first camps on the cell 1. Based on the path information recorded in Table 1, because the cell 3 has a largest coverage area, the terminal device may be first handed over to the cell 3, and then handed over from the cell 3 to the cell 7 in the node 2. Because the cell 7 has a largest coverage area in the node 2, the terminal device camps on the cell 7 until the terminal device reaches a cell edge of the cell 7, and then is directly handed over from the cell 7 to the cell 10 in the node 3 according to the first handover policy. Therefore, the terminal device chooses to camp on the cell with the largest frequency coverage area, so that a quantity of cell handovers in a high-speed movement scenario can be effectively reduced.

In this example, after determining a cell that meets a camping condition, the terminal device determines whether the source cell on which the terminal device currently camps is the cell that meets the camping condition. If the terminal device determines that the source cell is not the cell that meets the camping condition, the terminal device does not need to wait for a trigger event indicated by the network side device to occur, and the terminal device may directly send a third measurement report, and uses the third measurement report to carry an identifier of an optimal cell, to trigger the network side device in advance to deliver a handover instruction, so as to complete a handover to the cell that meets the camping condition.

For example, the source cell of the terminal device is the cell 1. When the terminal device detects signals in the cell 1, the cell 2, and the cell 3 in the node 1, the terminal device determines, based on the path information, that only the cell 3 uses an FDD mechanism. Therefore, the terminal device directly sends the third measurement report to the network side device, where the third measurement report carries an identifier of the cell 3, so that the network side device delivers a handover instruction to control the terminal device to hand over from the cell 1 to the cell 3.

For example, the source cell of the terminal device is the cell 3. When the terminal device detects signals in the cell 1, the cell 2, and the cell 3 in the node 1, the terminal device determines, based on the path information, that only the cell 3 uses an FDD mechanism. Therefore, the terminal device determines that the source cell is an optimal cell in the node 1, and the terminal device does not report the third measurement report, and continues to camp on the cell 3.

For the cells in the node, the terminal device may autonomously choose to camp on an optimal cell, thereby effectively improving user experience.

Figure 10:
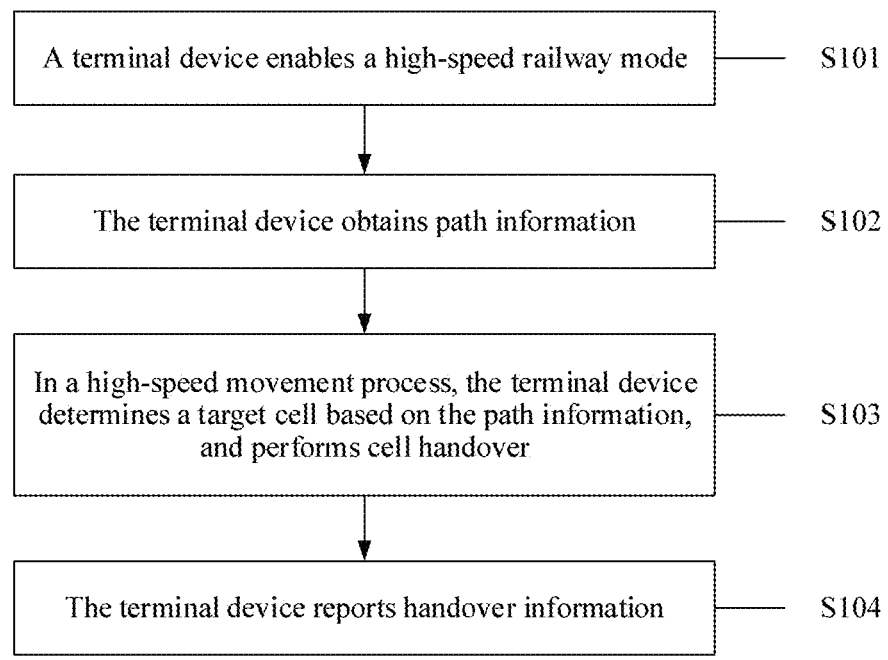
FIG. 10 is a flowchart 2 of an embodiment of a cell handover method in a high-speed movement scenario according to this application.

Optionally, as shown in FIG. 10, after S103, the method may further include the following step:

S104: The terminal device reports handover information.

After the terminal device reaches an end point, the terminal device may report the handover information to the network side device. The handover information may include a handover path of the terminal device in a high-speed movement process. Specifically, the handover information may include an identifier of a source cell and an identifier of a destination cell in each cell handover performed by the terminal device. For example, in a process in which the terminal device moves along the high-speed railway line 1, a handover path is: the cell 3→the cell 7→the cell 10. In this case, after the terminal device reaches an end point of the high-speed railway line 1, the reported handover information may be shown in Table 3.

| Handover number | Source cell | Destination cell |
| --- | --- | --- |
| 1 | Cell 3 | Cell 7 |
| 2 | Cell 7 | Cell 10 |

The network side device may periodically optimize the path information based on a plurality of pieces of handover information reported by terminal devices. For example, one week is used as an optimization period. Statistics about a handover path that is most frequently used in the high-speed railway line 1 are collected in each week. For example, the handover path is: the cell 3→the cell 7→the cell 10. The network side device may set the path as an optimal handover path. In each week, the network side device collects statistics about a cell that is not marked as a high-speed railway dedicated network. If a quantity of times that the cell occurs in the handover information reported by the terminal device exceeds a specific threshold, the network side device allocates a high-speed railway dedicated identifier to the cell, to mark the cell as a high-speed railway dedicated cell, and then determines, based on a location of the cell, a node to which the cell belongs.

For example, in one week, if a quantity of times that the handover information received by the network side device indicates a handover path the cell 3→a cell 11→the cell 10 exceeds a specific threshold, the network side device may determine that the cell 11 belongs to the node 2, and the network side device adds an identifier of the cell 11 to information about the node 2 in each piece of path information.

Optionally, when the terminal device is in an idle mode, the terminal device needs to monitor signal quality of a serving cell and a neighboring cell at any time, to perform cell reselection when the signal quality of the serving cell does not meet a preset condition. In this application, when performing cell reselection, the terminal device may determine, based on the path information, whether a neighboring cell in which a signal can be detected is the cell on the high-speed railway dedicated network. If the terminal device detects the cell on the high-speed railway dedicated network in the cell reselection process, the terminal device chooses to camp on the cell on the high-speed railway dedicated network.

Figure 11:
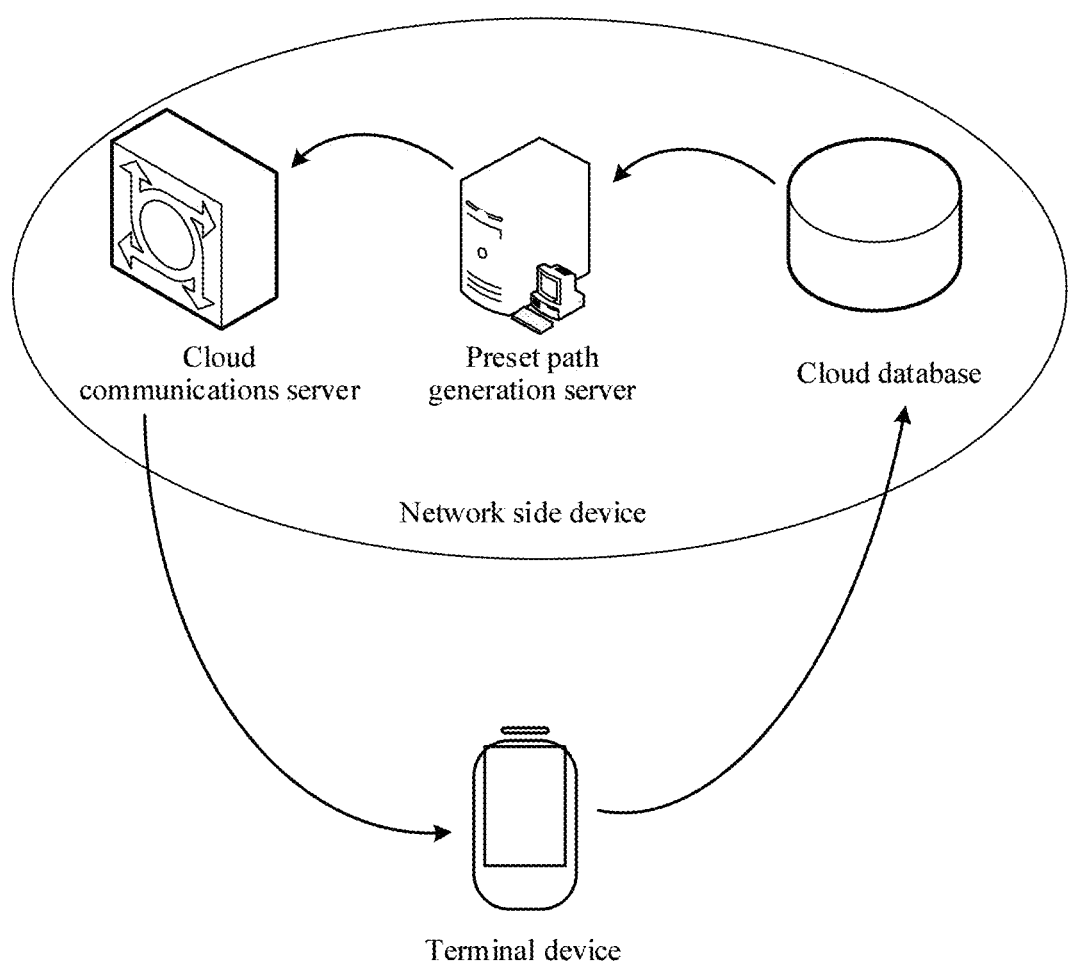
FIG. 11 is a block diagram of a big-data artificial intelligence (artificial intelligent, AI) learning communications system according to this application.

Optionally, the cell handover method in the high-speed movement scenario provided in this application may be implemented based on a big-data artificial intelligence (artificial intelligent, AI) learning mechanism. As shown in FIG. 11, a cloud network side device may include a cloud communication server, a preset path generation server, and a cloud database. The cloud database is configured to collect a large amount of handover information reported by terminal devices. The preset path generation server obtains the large amount of handover information from the cloud database, then calculates the large amount of obtained handover information based on the big-data AI learning mechanism, to generate path information of a high-speed railway line, and finally imports the generated path information to the cloud communications server. The cloud communications server is configured to push the path information to a terminal device that enables a high-speed railway mode.

Figure 12:
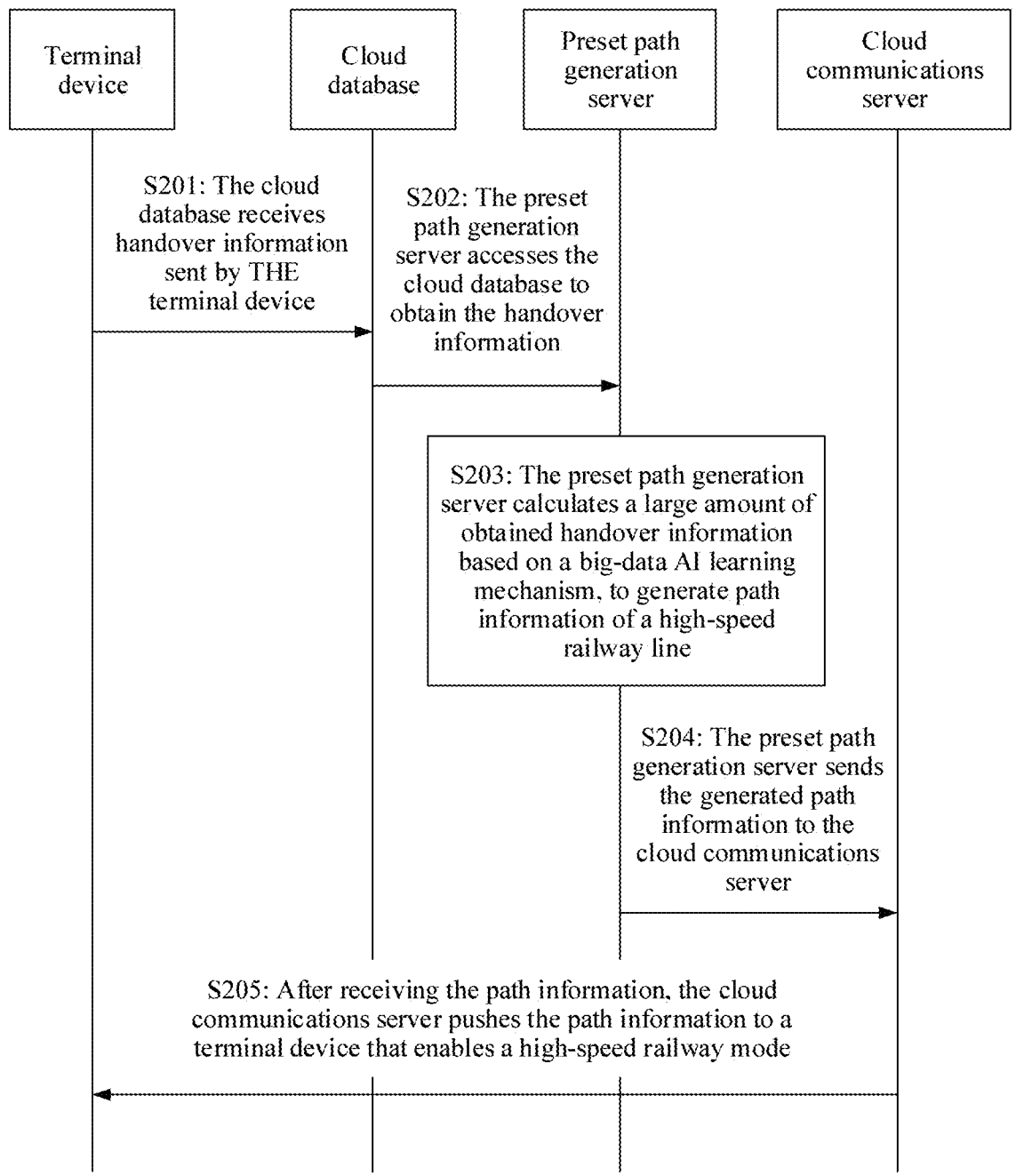
FIG. 12 is a flowchart of an embodiment of a method for setting path information based on a big-data AI learning mechanism according to this application.

Specifically, a method for setting path information based on a big-data AI learning mechanism may be shown in FIG. 12. The method includes the following steps.

S201: A cloud database receives handover information sent by a terminal device.

The cloud database receives, in real time, a large amount of handover information sent by terminal devices. For content of each piece of handover information sent by each terminal device, refer to the descriptions in S104. It may be understood that in the large amount of handover information collected by the cloud database, a plurality of pieces of handover information is collected for each high-speed railway line. For example, if the cloud database can receive the handover information reported by the terminal device that uses the high-speed railway station B as an end point, the handover information collected by the cloud database includes handover information corresponding to each high-speed railway line that uses the high-speed railway station Bas an end point.

S202: A preset path generation server accesses the cloud database to obtain the handover information.

The preset path generation server may periodically access the cloud database. For example, the preset path generation server accesses the cloud database once every other week, and then obtains all handover information collected by the cloud database in one week.

S203: The preset path generation server calculates the large amount of obtained handover information based on a big-data AI learning mechanism, to generate path information of a high-speed railway line.

It may be understood that the preset path generation server may divide the large amount of obtained handover information, to obtain handover information corresponding to each high-speed railway line, then calculates, based on the big-data AI learning mechanism, the handover information corresponding to each high-speed railway line, and generates or optimizes path information of each high-speed railway line.

S204: The preset path generation server sends the generated path information to a cloud communications server.

S205: After receiving the path information, the cloud communications server pushes the path information to a terminal device that enables a high-speed railway mode.

Each time receiving the path information sent by the preset path generation server, the cloud communications server may replace the locally stored path information corresponding to the high-speed railway line, and then pushes the path information to the terminal device after detecting the terminal device that enables the high-speed railway mode.

Figure 13:
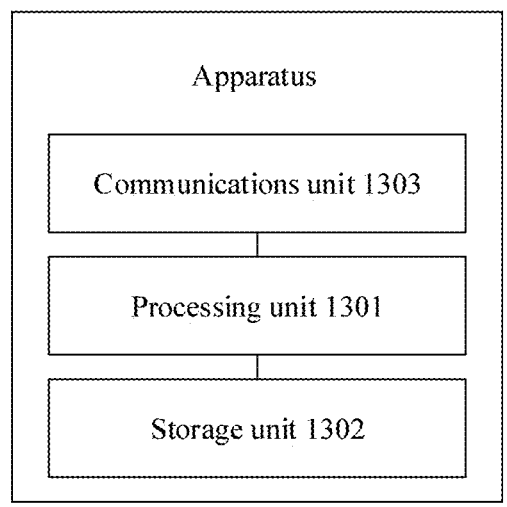
FIG. 13 is a schematic structural diagram of an apparatus according to this application.

The following describes an apparatus provided in an embodiment of this application. As shown in FIG. 13, details are as follows:

The apparatus includes a processing unit 1301 and a storage unit 1302. Optionally, the apparatus further includes a communications unit 1303. The processing unit 1301, the storage unit 1302, and the communications unit 1303 are connected by using a communications bus.

The storage unit 1302 may include one or more memories. The memory may be a component configured to store a program or data in one or more devices or circuits. The storage unit 1302 may exist independently, and is connected to the processing unit 1301 by using the communications bus. The storage unit may alternatively be integrated into the processing unit 1301.

The communications unit 1303 may be an apparatus that has a transceiver function, and is configured to communicate with another network device or a communications network.

The apparatus 1300 may be applied to a terminal device, a circuit, a hardware component, or a chip.

The apparatus 1300 may be the terminal device in the embodiments of this application.

The terminal device may be a terminal device such as a mobile phone, a tablet computer, a notebook computer, a UMPC (Ultra-mobile Personal Computer, ultra-mobile personal computer), a netbook, or a PDA (Personal Digital Assistant, personal digital assistant). The following uses an example in which the terminal device is the mobile phone to describe, with reference to FIG. 14, some structures of the mobile phone related to the embodiments of this application.

Figure 14:
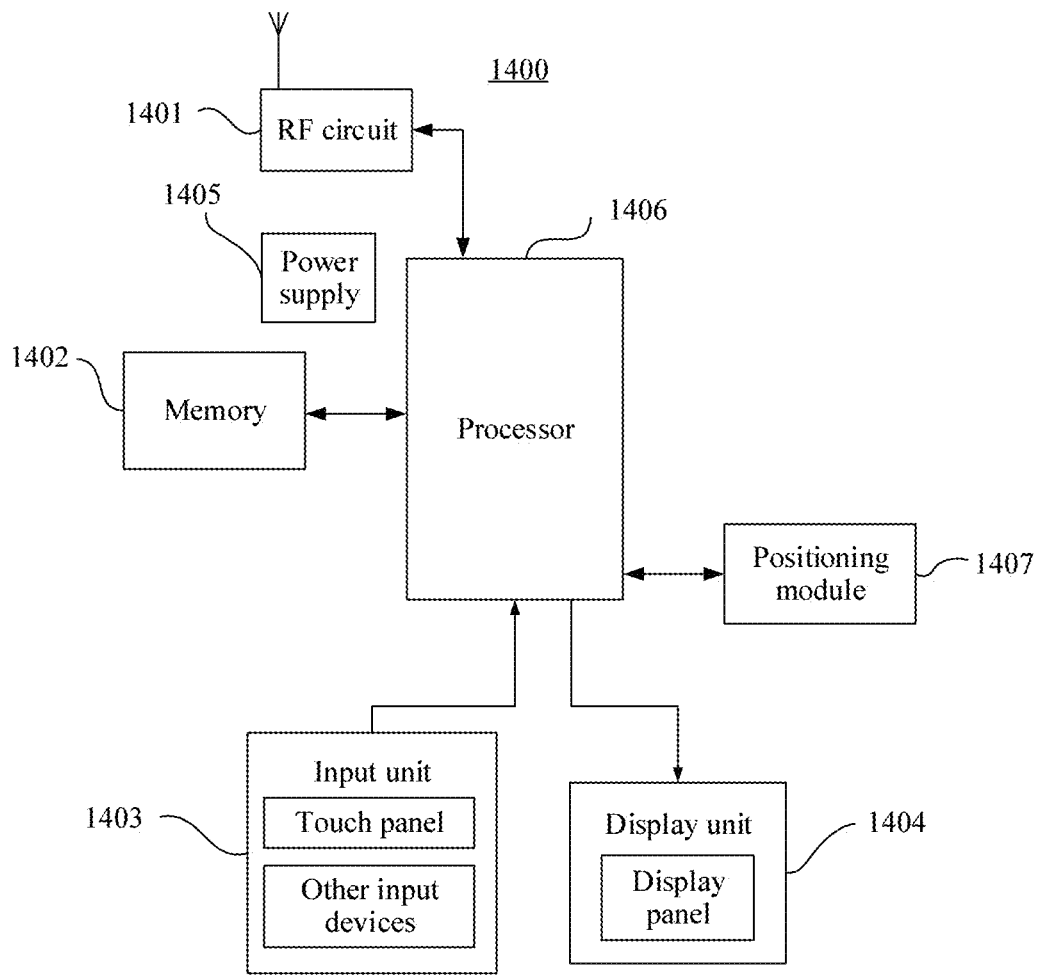
FIG. 14 is a schematic structural diagram of a mobile phone according to this application.

As shown in FIG. 14, a mobile phone 1400 includes components such as a radio frequency (radio frequency, RF) circuit 1401, a memory 1402, an input unit 1403, a display unit 1404, a power supply 1405, a processor 1406, and a positioning module 1407. A person skilled in the art may understand that a structure of the mobile phone shown in FIG. 14 imposes no limitation on the mobile phone, and the mobile phone may include more or fewer components than those shown in the figure, or combine some components, or have different component arrangements.

The RF circuit 1401 may be configured to: receive and send information under control of the processor 1406. Details are as follows: transmitting the received information to the processor 1406 for processing, and then sending, to another communications device, the information transmitted by the processor 1406. Usually, the RF circuit 1401 includes but is not limited to an antenna, at least one amplifier, a transceiver, a coupler, an LNA (low noise amplifier, low noise amplifier), a duplexer, and the like. In addition, the RF circuit 1401 may further communicate with a network and another device through wireless communication. The wireless communication may use any communications standard or protocol, including but not limited to a GSM (global system of mobile communication, global system for mobile communications), a GPRS (general packet radio service, general packet radio service), CDMA (code division multiple access, code division multiple access), WCDMA (wideband code division multiple access, wideband code division multiple access), LTE (long term evolution, long term evolution), an email, an SMS (short messaging service, short message service), a short-distance communications technology, and the like.

The memory 1402 may include at least one of the following types: a read-only memory (read-only memory, ROM) or another type of static storage device that can store static information and an instruction, or a random access memory (random access memory, RAM) or another type of dynamic storage device that can store information and an instruction, or may be an electrically erasable programmable read-only memory (Electrically erasable programmable read-only memory, EEPROM). In some scenarios, the memory may alternatively be a compact disc read-only memory (compact disc read-only memory, CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. However, the memory is not limited herein.

The memory 1402 may exist independently, and is connected to the processor 1406. Optionally, the memory 1402 may alternatively be integrated into the processor 1406, for example, integrated into a chip. The memory 1402 can store a computer execution instruction for executing the technical solution in this embodiment of this application, and the processor 1406 controls execution of the computer execution instruction. Various types of executed computing execution instructions may also be considered as drivers of the processor 1406. For example, the processor 1406 is configured to execute the computer execution instruction stored in the memory 1402, to implement the method procedures shown in FIG. 2 to FIG. 5, FIG. 10, and FIG. 12 in the foregoing embodiments of this application.

In this embodiment of this application, the processor such as the processor 1406 may include at least one of the following types: a general-purpose central processing unit (Central Processing Unit, CPU), a digital signal processor (Digital Signal Processor, DSP), a microprocessor, an application-specific integrated circuit (Application-Specific Integrated Circuit, ASIC), a microcontroller unit (Microcontroller Unit, MCU), a field programmable gate array (Field Programmable Gate Array, FPGA), or an integrated circuit configured to implement a logical operation. For example, the processor 1406 may be a single-core processor (single-CPU) or a multi-core processor (multi-CPU). The at least one processor 1406 may be integrated into one chip or located on a plurality of different chips.

The input unit 1403 may be configured to: receive entered number or character information, and generate key signal input related to a user setting and function control of the mobile phone 1400. Specifically, the input unit 1403 may include a touchscreen and other input devices. The touchscreen is also referred to as a touch panel, and may collect a touch operation (for example, an operation performed by a user on or near the touchscreen by using any proper object or accessory such as a finger or a stylus) performed by the user on or near the touchscreen, and drive a corresponding connection apparatus by using a preset program. Optionally, the touchscreen may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into contact coordinates, and then sends the contact coordinates to the processor 1406. The touch controller can receive and execute a command sent by the processor 1406. In addition, the touchscreen may be implemented in various types such as a resistive type, a capacitive type, an infrared type, and a surface acoustic wave type. The input unit 140 may further include the other input devices in addition to the touchscreen. Specifically, the other input devices may include but are not limited to one or more of a physical keyboard, a function key (for example, a volume control key or a power on/off key), and the like.

The display unit 1404 may be configured to display information entered by the user or information provided for the user, and various menu bars and/or icons of the mobile phone 1400. The display unit 1404 may include a display panel. Optionally, the display panel may be configured in a form of an LCD (Liquid Crystal Display, liquid crystal display), an OLED (Organic Light-Emitting Diode, organic light-emitting diode), or the like. Further, the touchscreen may cover the display panel. After detecting a touch operation on or near the touchscreen, the touchscreen transfers the touch operation to the processor 1406, to determine a type of the touch event. Then, the processor 1406 provides corresponding visual output on the display panel based on the type of the touch event. Although in FIG. 14, the touchscreen and the display panel are used as two independent parts to implement input and input functions of the mobile phone 1400, in some embodiments, the touchscreen and the display panel may be integrated to implement the input and output functions of the mobile phone 1400.

The positioning module 1407 may include a GPS, a BDS, a GLONASS (GLONASS) satellite navigation system, a Galileo satellite navigation system, and the like.

The mobile phone 1400 further includes the power supply 1405 (for example, a battery) supplying power to all parts. Preferably, the power supply may be logically connected to the processor 1406 by using a power management system, to implement functions such as charging management, discharging management, and power consumption management by using the power management system.

In this example, the processing unit 1301 in FIG. 13 may be the processor 1406 in FIG. 14, and the storage unit 1302 in FIG. 13 may be the memory 1402 in FIG. 14.

Optionally, the apparatus may alternatively be a chip in the terminal device in the embodiments of this application. The storage unit 1302 may store a computer execution instruction of a method on a terminal device side, so that the processing unit 1301 performs the cell handover method performed by the terminal device in the high-speed movement scenario in the foregoing embodiment. The storage unit 1302 may be a register, a cache, a RAM, or the like, and the storage unit 1302 may be integrated into the processing unit 1301. The storage unit 1302 may be a ROM or another type of static storage device that can store static information and an instruction. The storage unit 1302 may be independent of the processing unit 1301. The communications unit 1403 may be an input/output interface, a pin, a circuit, or the like.

An embodiment of this application further provides a computer readable storage medium. The method described in the foregoing embodiment may be all or partially implemented by using software, hardware, firmware, or any combination thereof. If the method is implemented in software, the functions serving as one or more instructions or code may be stored or transmitted on the computer readable medium. The computer readable medium may include a computer storage medium and a communications medium, and may further include any medium that can transfer a computer program from one place to another. The storage medium may be any available medium accessible to a computer.

In an optional design, the computer readable medium may include a RAM, a ROM, an EEPROM, a CD-ROM or another optical disc storage, a magnetic disk storage or another magnetic storage device, or any other medium that can be configured to carry or store required program code in a form of an instruction or a data structure and that may be accessed by the computer. In addition, any connection is appropriately referred to as a computer readable medium. For example, if a coaxial cable, an optical fiber cable, a twisted pair, a digital subscriber line (DSL), or wireless technologies (such as infrared, radio, and a microwave) are used to transmit software from a website, a server, or another remote source, the coaxial cable, the optical fiber cable, the twisted pair, the DSL or wireless technologies such as infrared, radio, and a microwave are included in a definition of the medium. Magnetic disks and optical discs used in this specification include a compact disk (CD), a laser disk, an optical disc, a digital versatile disc (DVD), a floppy disk, and a Blu-ray disc, where the magnetic disks usually magnetically reproduce data, and the optical discs optically reproduce data by using laser light. The foregoing combination should also be included within the scope of the computer readable medium.

An embodiment of this application further provides a computer program product. The method described in the foregoing embodiment may be all or partially implemented by using software, hardware, firmware, or any combination thereof. When the method is implemented in software, the method may be all or partially implemented in a form of a computer program product. The computer program product includes one or more computer instructions. When the computer program instructions are loaded and executed on a computer, all or some of the procedures or functions described in the foregoing method embodiments are generated. The computer may be a general-purpose computer, a dedicated computer, a computer network, a network device, user equipment, or another programmable apparatus.

The objectives, technical solutions, and beneficial effects of the present invention are further described in detail in the foregoing specific implementations. It should be understood that the foregoing descriptions are merely specific implementations of the present invention, but are not intended to limit the protection scope of the present invention. Any modification, equivalent replacement, or improvement made based on technical solutions of the present invention shall fall within the protection scope of the present invention.

What is claimed is:

1. A method in a high-speed movement scenario, wherein the method is implemented by a terminal device, and wherein the method comprises:
    enabling a high-speed railway function of the terminal device,
    camping by the terminal device on a source cell, and wherein the source cell is located in a first node;
    obtaining, in response to the high-speed railway function, first path information, wherein the first path information comprises a handover sequence of a plurality of nodes on a movement path of the terminal device and information about each of the nodes, and wherein the information about each of the nodes comprises a first identifier of a corresponding node and second identifiers of a plurality of cells in the corresponding node;
    determining, based on the first path information, a first target cell, wherein the first target cell is located in a next node from the handover sequence of the plurality of nodes;
    obtaining, from a network side device, a first threshold that triggers the terminal device to report a first measurement report,
    configuring the first measurement report to trigger the network side device to control the terminal device to hand over from the source cell to the first target cell;
    reporting the first measurement report upon determining that a measurement value of the source cell meets a second threshold, wherein the second threshold is greater than the first threshold,
    determining, based on the first path information, a second target cell in a node previous to the first node from the handover sequence of the plurality of nodes; and
    reporting a second measurement report upon determining that the measurement value meets a third threshold, wherein the third threshold is less than the first threshold, and
    configuring the second measurement report to trigger the network side device to control the terminal device to hand over from the source cell to the second target cell.

2. The method of claim 1, wherein after reporting the first measurement report, the method further comprises:
    receiving, from the network side device, a handover command instructing the terminal device to hand over from the source cell to the first target cell;
    handing over, in response to the handover command, from the source cell to the first target cell; and
    camping on the first target cell after the handing over.

3. The method of claim 1, wherein the measurement value is a reference signal received power (RSRP), a received signal strength indicator (RSSI), or a reference signal received quality (RSRQ).

4. The method of claim 1, wherein the information about each of the nodes further comprises handover priorities, and wherein the method further comprises detecting that, in the next node, the first target cell has a highest priority.

5. The method of claim 1, further comprising:
    obtaining the first path information, wherein the first path information is locally pre-stored; or
    receiving, from the network side device, the first path information.

6. The method of claim 1, further comprising:
    obtaining a path information set comprising second path information of a plurality of paths, wherein the paths comprise the movement path;
    determining, based on the second path information, a plurality of target nodes of the first node; and
    determining that one of the target nodes is the next node when a detected cell belongs to the one of the target nodes and does not belong to a second node other than the one of the target nodes.

7. The method of claim 1, wherein all cells recorded in the first path information are on a high-speed railway dedicated network, and wherein when the terminal device is in an idle mode in a high-speed movement process and when performing a cell reselection, the method further comprises:
    determining, based on the first path information, that a detected neighboring cell of the source cell is on the high-speed railway dedicated network; and
    camping on the detected neighboring cell.

8. A terminal device comprising:
a memory configured to store computer executable instructions; and
a processor coupled to the memory, wherein the computer executable instructions cause the processor to be configured to:
  enable a high-speed railway function of the terminal device,
  camp on a source cell, and wherein the source cell is located in a first node;
  obtain, in response to the high-speed railway function, first path information, wherein the first path information comprises a handover sequence of a plurality of nodes on a movement path of the terminal device and information about each of the nodes, and wherein the information about each of the nodes comprises a first identifier of a corresponding node and second identifiers of a plurality of cells in the corresponding node;
  determine, based on the first path information, a first target cell, wherein the first target cell is located in a next node from the handover sequence of the plurality of nodes;
  obtain, from a network side device, a first threshold configured to trigger the terminal device to report a first measurement report,
  configure the first measurement report to trigger the network side device to control the terminal device to hand over from the source cell to the first target cell;
  report the first measurement report when a measurement value of the source cell meets a second threshold, wherein the second threshold is greater than the first threshold;
  obtain a path information set comprising second path information of a plurality of paths, wherein the paths comprise the movement path;
  determine, based on the second path information, a plurality of target nodes; and
  determine that one of the target nodes is the next node when a detected cell belongs to one of the target nodes and does not belong to a second node other than one of the target nodes.

9. The terminal device of claim 8, wherein after reporting the first measurement report, the computer executable instructions further cause the processor to be configured to:
  receive, from the network side device, a handover command instructing the terminal device to hand over from the source cell to the first target cell;
  hand over, in response to the handover command, from the source cell to the first target cell; and
  camp on the first target cell after the handing over.

10. The terminal device of claim 8, wherein the measurement value is a reference signal received power (RSRP), a received signal strength indicator (RSSI), or a reference signal received quality (RSRQ).

11. The terminal device of claim 8, wherein the information about each of the nodes further comprises handover priorities, and wherein the computer executable instructions further cause the processor to be configured to detect that, in the next node, the first target cell has a highest priority.

12. The terminal device of claim 8, wherein the computer executable instructions further cause the processor to be configured to:
  obtain the first path information, wherein the first path information that-is locally pre-stored; or
  receive, from the network side device, the first path information.

13. The terminal device of claim 8, wherein all cells recorded in the first path information are on a high-speed railway dedicated network, and wherein when the terminal device is in an idle mode in a high-speed movement process and when performing a cell reselection, the computer executable instructions further cause the processor to be configured to:
  determine, based on the first path information, that a detected neighboring cell of the source cell is on the high-speed railway dedicated network; and
  control the terminal device to camp on the detected neighboring cell.

14. A terminal device comprising:
a memory configured to store computer executable instructions; and
a processor coupled to the memory, wherein the computer executable instructions cause the processor to be configured to:
  enable a high-speed railway function of the terminal device,
  camp on a source cell, and wherein the source cell is located in a first node;
  obtain, in response to the high-speed railway function, first path information, wherein the first path information comprises a handover sequence of a plurality of nodes on a movement path of the terminal device and information about each of the nodes, and wherein the information about each of the nodes comprises a first identifier of a corresponding node and second identifiers of a plurality of cells in the corresponding node;
determine, based on the first path information, a first target cell, wherein the first target cell is located in a next node from the handover sequence of the plurality of nodes;
  obtain, from a network side device, a first threshold configured to trigger the terminal device to report a first measurement report,
  configure the first measurement report to trigger the network side device to control the terminal device to hand over from the source cell to the first target cell;
  report the first measurement report when a measurement value of a source cell meets a second threshold, wherein the second threshold is greater than the first threshold;
determine, based on the first path information, a second target cell in a node previous to the first node from the handover sequence of the plurality of nodes; and
  report a second measurement report when the measurement value meets a third threshold, wherein the third threshold is less than the first threshold, and
  configure the second measurement report to trigger the network side device to control the processor to hand over from the source cell to the second target cell.

15. The terminal device of claim 14, wherein after reporting the first measurement report, the computer executable instructions further cause the processor to be configured to:
  receive, from the network side device, a handover command instructing the terminal device to hand over from the source cell to the first target cell;
  hand over, in response to the handover command, from the source cell to the first target cell; and
  camp on the first target cell after the handing over.

16. The terminal device of claim 14, wherein the measurement value is a reference signal received power (RSRP), a received signal strength indicator (RSSI), or a reference signal received quality (RSRQ).

17. The terminal device of claim 14, wherein the information about each of the nodes further comprises handover priorities, and wherein the computer executable instructions further cause the processor to be configured to detect that, in the next node, the first target cell has a highest priority.

18. The terminal device of claim 14, wherein the computer executable instructions further cause the processor to be configured to:
obtain the first path information, wherein the first path information is locally pre-stored; or
receive, from the network side device, the first path information.

19. The terminal device of claim 14, wherein the computer executable instructions further cause the processor to be configured to:
obtain a path information set comprising second path information of a plurality of paths, wherein the paths comprise the movement path;
determine, based on the second path information, a plurality of target nodes; and
determine that one of the target nodes is the next node when a detected cell belongs to one of the target nodes and does not belong to a second node other than one of the target nodes.

20. The terminal device of claim 14, wherein all cells recorded in the first path information are on a high-speed railway dedicated network, and wherein when the terminal device is in an idle mode in a high-speed movement process and when performing a cell reselection, the computer executable instructions further cause the processor to be configured to:
determine, based on the first path information, that a detected neighboring cell of the source cell is on the high-speed railway dedicated network; and
control the terminal device to camp on the detected neighboring cell.

* * * * *